(12) United States Patent
Miller et al.

(10) Patent No.: US 8,130,693 B2
(45) Date of Patent: Mar. 6, 2012

(54) MIMO SATELLITE SYSTEM

(75) Inventors: Mark J. Miller, Vista, CA (US);
Thomas Eidenschink, Carlsbad, CA (US); Aniruddha Das, San Diego, CA (US)

(73) Assignee: ViaSat, Inc., Carlsbad, CA (US)

( * ) Notice: Subject to any disclaimer, the term of this patent is extended or adjusted under 35 U.S.C. 154(b) by 1092 days.

(21) Appl. No.: 11/971,852

(22) Filed: Jan. 9, 2008

(65) Prior Publication Data

US 2009/0034448 A1 Feb. 5, 2009

Related U.S. Application Data

(60) Provisional application No. 60/956,113, filed on Aug. 15, 2007, provisional application No. 60/884,143, filed on Jan. 9, 2007, provisional application No. 60/884,134, filed on Jan. 9, 2007, provisional application No. 60/884,146, filed on Jan. 9, 2007, provisional application No. 60/884,142, filed on Jan. 9, 2007, provisional application No. 60/884,153, filed on Jan. 9, 2007, provisional application No. 60/884,190, filed on Jan. 9, 2007, provisional application No. 60/884,181, filed on Jan. 9, 2007, provisional application No. 60/884,180, filed on Jan. 9, 2007, provisional application No. 60/884,150, filed on Jan. 9, 2007, provisional application No. 60/884,152, filed on Jan. 9, 2007, provisional application No. 60/884,139, filed on Jan. 9, 2007, provisional application No. 60/884,147, filed on Jan. 9, 2007, provisional application No. 60/884,182, filed on Jan. 9, 2007, provisional application No. 60/884,130, filed on Jan. 9, 2007, provisional application No. 60/884,188, filed on Jan. 9, 2007, provisional application No. 60/884,140, filed on Jan. 9, 2007, provisional application No. 60/884,137, filed on Jan. 9, 2007, provisional application No. 60/884,156, filed on Jan. 9, 2007, provisional application No. 60/884,136, filed on Jan. 9, 2007, provisional application No. 60/884,138, filed on Jan. 9, 2007, provisional application No. 60/884,120, filed on Jan. 9, 2007, provisional application No. 60/884,210, filed on Jan. 9, 2007.

(51) Int. Cl.
*H04B 7/185* (2006.01)
*H04W 4/00* (2009.01)

(52) U.S. Cl. ........................................ 370/316; 455/427

(58) Field of Classification Search ........................ None
See application file for complete search history.

(56) References Cited

U.S. PATENT DOCUMENTS 5,233,626 A 8/1993 Ames
(Continued)

FOREIGN PATENT DOCUMENTS

EP 1608085 A 12/2005
(Continued)

OTHER PUBLICATIONS

Kaiser, Thomas et al., "Smart Antennas—State of the Art, "EURASIP, no date, 1 page.
(Continued)

*Primary Examiner* — Hassan Phillips
*Assistant Examiner* — Eunsook Choi
(74) *Attorney, Agent, or Firm* — Kilpatrick Townsend & Stockton LLP

(57) ABSTRACT

A satellite communication system is disclosed that utilizes multiple antenna for subscriber terminals to process streams. A first node relays a first stream between the ground station and the subscriber terminals. A second node relays the second lower information rate signal to the subscriber terminals. Spatial relationships are used to differentiate the first stream from the second stream. At least one of the first and second nodes includes a satellite, and the first and second nodes are separated by 50 miles or more. Optionally, frequency ranges for the first and second streams overlap in time. In some cases, the second stream can contain additional information where the second node is terrestrial.

24 Claims, 16 Drawing Sheets

U.S. PATENT DOCUMENTS

| | | | |
|---|---|---|---|
| 5,319,673 | A | 6/1994 | Briskman |
| 5,864,579 | A | 1/1999 | Briskman |
| 5,867,109 | A | 2/1999 | Wiedeman |
| 5,907,541 | A | 5/1999 | Fairholm et al. |
| 5,995,495 | A | 11/1999 | Sampson |
| 6,351,499 | B1 | 2/2002 | Paulraj et al. |
| 6,549,774 | B1 | 4/2003 | Titlebaum et al. |
| 6,570,858 | B1 | 5/2003 | Emmons, Jr. et al. |
| 6,927,736 | B1 | 8/2005 | Kornbau |
| 6,944,139 | B1 | 9/2005 | Campanella |
| 6,954,446 | B2 | 10/2005 | Kuffner |
| 6,975,600 | B1 | 12/2005 | Vaughan et al. |
| 7,142,864 | B2 | 11/2006 | Laroia et al. |
| 7,203,490 | B2 * | 4/2007 | Karabinis et al. ............ 455/428 |
| 7,260,369 | B2 | 8/2007 | Feher |
| 7,280,810 | B2 | 10/2007 | Feher |
| 7,634,232 | B2 | 12/2009 | Waxman |
| 7,974,571 | B2 | 7/2011 | Dankberg et al. |
| 2002/0008412 | A1 | 1/2002 | Patz et al. |
| 2002/0032003 | A1 | 3/2002 | Avitzour et al. |
| 2002/0123344 | A1 | 9/2002 | Criqui |
| 2003/0058834 | A1 * | 3/2003 | Soulie et al. .................. 370/350 |
| 2003/0181159 | A1 | 9/2003 | Heinerscheid et al. |
| 2004/0072539 | A1 * | 4/2004 | Monte et al. ................. 455/13.4 |
| 2004/0110468 | A1 | 6/2004 | Perlman |
| 2004/0165689 | A1 * | 8/2004 | Akopian et al. .............. 375/371 |
| 2005/0042999 | A1 | 2/2005 | Rappaport |
| 2005/0141644 | A1 | 6/2005 | Sadowsky |
| 2005/0162306 | A1 * | 7/2005 | Babitch et al. .......... 342/357.05 |
| 2005/0181752 | A1 | 8/2005 | Sahota |
| 2005/0227631 | A1 | 10/2005 | Robinett |
| 2005/0265273 | A1 * | 12/2005 | Karabinis et al. ............ 370/316 |
| 2005/0281221 | A1 | 12/2005 | Roh et al. |
| 2006/0009177 | A1 * | 1/2006 | Persico et al. ................ 455/143 |
| 2006/0165120 | A1 * | 7/2006 | Karabinis ..................... 370/466 |
| 2006/0273967 | A1 | 12/2006 | Gat |
| 2006/0280262 | A1 * | 12/2006 | Malladi ........................ 375/299 |
| 2007/0030116 | A1 | 2/2007 | Feher |
| 2007/0032220 | A1 | 2/2007 | Feher |
| 2007/0032246 | A1 | 2/2007 | Feher |
| 2007/0032266 | A1 | 2/2007 | Feher |
| 2007/0032832 | A1 | 2/2007 | Feher |
| 2007/0153731 | A1 * | 7/2007 | Fine .............................. 370/329 |
| 2007/0155319 | A1 * | 7/2007 | Monte et al. ................. 455/12.1 |
| 2007/0167187 | A1 | 7/2007 | Rezvani et al. |
| 2007/0184849 | A1 * | 8/2007 | Zheng ........................ 455/456.1 |
| 2007/0202890 | A1 | 8/2007 | Feher |
| 2007/0238483 | A1 | 10/2007 | Boireau et al. |
| 2008/0089269 | A1 * | 4/2008 | Tsutsui ......................... 370/316 |
| 2008/0247351 | A1 | 10/2008 | Dankberg et al. |
| 2008/0261522 | A1 | 10/2008 | Dankberg et al. |

FOREIGN PATENT DOCUMENTS

| | | |
|---|---|---|
| KR | 97-007605 | 2/1994 |
| KR | 1994-0013241 | 6/1994 |
| KR | 1999-0072064 | 9/1999 |
| KR | 10-2004-0019952 | 3/2004 |
| WO | WO 01/33738 A | 5/2001 |
| WO | WO 01/45300 A | 6/2001 |
| WO | WO 2006/018678 A | 2/2006 |

OTHER PUBLICATIONS

Liolis, Konstantinos P. et al., "Multi-Satellite MIMO Communications at Ku-Band and Above: Investigations on Spatial Multiplexing for Capacity Improvement and Selection Diversity for Interface Mitigation, "EURASIP Journal on Wireless Communication and Networking, Hindawi Publishing Co., vol. 2007, Article ID59608, 11 pages.

Mietzner, Jan et al., "Distributed Space-Time Codes for Cooperative Wireless Networks in the Presence of Different Propagation Delays and Path Losses," Proc. 3rd IEEE Sensor Array Multichannel Signal Processing Workshop (SAM 2004), Sitges, Barcelona, Spain, Jul. 2005, 6 pages.

Yamashita, Fumihiro et al., "Broadband Multiple Satellite MIMO System," IEEE, 0-7803-9152-7/05, 2005, pp. 2632-2636.

Cummings, M. et al., "Mode Switching and Software Download for Software Defined Radio: The SDR Forum Approach", IEEE Communications Magazine, Aug. 1, 1999, pp. 104-106, vol. 37, No. 8, IEEE Service Center, Piscataway, US.

Dagres, L. et al., "Flexible-Radio: A General Framework with PHY-layer algorithm-design insights", The International Conference on Belgrade, Serbia and Montenegro Nov. 21-24, 2005, Computer as a Tool, 2005, Eurocon 2005, Nov. 21, 2005, pp. 120-123, vol. 1, IEEE Piscataway, US.

Supplemental Notice of Allowability of Mar. 9, 2011 for U.S. Appl. No. 11/818,972; 3 pages.

Notice of Allowance of Feb. 17, 2011 for U.S. Appl. No. 11/818,972; 7 pages.

Notice of Allowance of Jan. 5, 2010 for U.S. Appl. No. 12/080,968; 11 pages.

Non-Final Office Action of Aug. 30, 2010 for U.S. Appl. No. 11/818,972; 12 pages.

International Search Report and Written Opinion for PCT Patent Application No. PCT/US2008/050620 mailed on Oct. 23, 2008; 16 pages.

International Search Report and Written Opinion for PCT Patent Application No. PCT/US2008/050623 mailed on Jun. 27, 2008; 10 pages.

International Search Report and Written Opinion for PCT Patent Application No. PCT/US2008/050621 mailed on Jun. 11, 2008; 10 pages.

Notice of Allowance of Apr. 14, 2011 for U.S. Appl. No. 11/818,972; 9 pages.

Notice of Allowance of Apr. 7, 2011 for U.S. Appl. No. 12/080,968; 11 pages.

* cited by examiner

MIMO SATELLITE SYSTEM

This application is a non-provisional, and claims the benefit of the following commonly assigned U.S. Provisional Patent Applications, which are all incorporated by references for all purposes:

U.S. Provisional Patent Application No. 60/884,143, filed Jan. 9, 2007 entitled "MIMO Satellite Subscriber Terminal"; Client Reference No. VS-0215);

U.S. Provisional Patent Application No. 60/884,134, filed Jan. 9, 2007 entitled "Dynamic Switching Between Antennas"; Client Reference No. VS-0216);

U.S. Provisional Patent Application No. 60/884,146, filed Jan. 9, 2007 entitled "Antenna Configuration for Wireless Multipath Signal Reception of Satellite Signals"; Client Reference No. VS-0217);

U.S. Provisional Patent Application No. 60/884,142, filed Jan. 9, 2007 entitled "MIMO Antenna with Gain on Horizon for Satellite Communications"; Client Reference No. VS-0218);

U.S. Provisional Patent Application No. 60/884,153, filed Jan. 9, 2007 entitled "Satellite Terrestrial Hybrid with Additional Content on Terrestrial"; Client Reference No. VS-0219);

U.S. Provisional Patent Application No. 60/884,190, filed Jan. 9, 2007 entitled "Use of Different Coding and Modulation for Satellite MIMO"; Client Reference No. VS-0220);

U.S. Provisional Patent Application No. 60/884,181, filed Jan. 9, 2007 entitled "Satellite Terrestrial Hybrid Using Same Frequency and MIMO"; Client Reference No. VS-0221);

U.S. Provisional Patent Application No. 60/884,180, filed Jan. 9, 2007 entitled "Two Satellites on Same Frequency to MIMO Subscriber Terminals"; Client Reference No. VS-0222);

U.S. Provisional Patent Application No. 60/884,150, filed Jan. 9, 2007 entitled "Coordinated Multiple Antenna Array for MIMO Communication with Satellite and Terrestrial Signals"; Client Reference No. VS-0223);

U.S. Provisional Patent Application No. 60/884,152, filed Jan. 9, 2007 entitled "Multi-Antenna System with Wireless Interface to Vehicle"; Client Reference No. VS-0224);

U.S. Provisional Patent Application No. 60/884,139, filed Jan. 9, 2007 entitled "Dynamic Switching between Different Sets of Antennas and Associated Subscriber Terminals"; Client Reference No. VS-0225);

U.S. Provisional Patent Application No. 60/884,147, filed Jan. 9, 2007 entitled "Base Station Reduction in Mobile Satellite Systems"; Client Reference No. VS-0226);

U.S. Provisional Patent Application No. 60/884,182, filed Jan. 9, 2007 entitled "Delay Tolerant MIMO Using Rolling Pilots"; Client Reference No. VS-0227);

U.S. Provisional Patent Application No. 60/884,130, filed Jan. 9, 2007 entitled "Directional Analog Beam Forming"; Client Reference No. VS-0231);

U.S. Provisional Patent Application No. 60/884,188, filed Jan. 9, 2007 entitled "Switch Transceiver Between One MIMO or n Independent SISO"; Client Reference No. VS-0232);

U.S. Provisional Patent Application No. 60/884,140, filed Jan. 9, 2007 entitled "MIMO Antenna with Polarization Diversity for Satellite Communications"; Client Reference No. VS-0233);

U.S. Provisional Patent Application No. 60/884,137, filed Jan. 9, 2007 entitled "Scalable Satellite Deployment"; Client Reference No. VS-0234);

U.S. Provisional Patent Application No. 60/884,156, filed Jan. 9, 2007 entitled "Signal Processing for Diverse Antenna Elements"; Client Reference No. VS-0235);

U.S. Provisional Patent Application No. 60/884,136, filed Jan. 9, 2007 entitled "Signal Scanning for Determination of Dynamic Switching Between Antennas"; Client Reference No. VS-0236);

U.S. Provisional Patent Application No. 60/884,138, filed Jan. 9, 2007 entitled "State Based Dynamic Switching Between Antennas"; Client Reference No. VS-0237);

U.S. Provisional Patent Application No. 60/884,120, filed Jan. 9, 2007 entitled "Layered Space-Time Processing"; Client Reference No. VS-0229);

U.S. Provisional Patent Application No. 60/884,210, filed Jan. 9, 2007 entitled "MIMO Mobile Satellite System"; Client Reference No. VS-0238); and U.S. Provisional Patent Application No. 60/956,113, filed Aug. 15, 2007 entitled "Satellite MIMO System"; Client Reference No. VS-0238-2).

BACKGROUND

This disclosure relates in general to satellite communication systems and, but not by way of limitation, to satellite communication utilizing wireless link enhancements.

Bi-directional satellite data delivery systems are becoming increasingly popular. Assuring signal communication is difficult in satellite systems, especially for mobile applications, that have size and power constraints. More powerful satellites that could increase link margin with a more powerful signal are costly to deploy and maintain.

Conventional satellite systems operate in single input/single output (SISO) mode and focus on direct links between the satellite and subscriber terminal. Diversity has been used to increase link availability. The same signal maybe sent through two physically distinct paths such that the subscriber terminal can choose the strongest signal or even combine the two signals.

Satellite systems suffer from obstructions and fading in certain circumstances. A line-of-sight to the satellite is generally preferable for a communication link. In cities and forests, buildings, trees and other obstructions can interfere with the data stream. Some satellite radio providers have used terrestrial repeaters that rebroadcast the same signal using a different frequency. When the satellite radio signal is obstructed, the same content can alternatively be received using the terrestrial repeater.

SUMMARY

In one embodiment, a satellite communication system that uses spatial diversity and/or spatial multiplexing is used with a MIMO antenna configuration on subscriber terminals. There are multiple nodes that communicate with the subscriber terminals. The multiple nodes at least includes at least one satellite and possibly some terrestrial base stations. The nodes transmit streams that are encoded separately. Frequency spectrum overlaps between the streams. The spatial relationship between the nodes is utilized by each subscriber terminal to differentiate the streams from the various nodes.

In another embodiment, a satellite communication system uses a satellite for a first stream and a terrestrial base station for a second stream. The second stream has a more information than the first stream. Additional information on the second stream can be used for localized information or information customized for a particular subscriber terminal, for example. The second stream may include some or all the information from the first stream. Both streams can optionally use overlapping frequencies. Subscriber terminals receiving the first and second streams can optionally use spatial diversity and/or spatial multiplexing with multiple antenna.

In one embodiment, a satellite communication system for bi-directional communication is disclosed that includes subscriber terminals, a first node and a second node. Each of the subscriber terminals uses a number of antenna and utilize at least some spatial multiplexing. Each of the subscriber terminals is configured to process a higher information rate signal constructed from at least a first lower information rate signal and a second lower information rate signal. The first node relays the first lower information rate signal between the ground station and the subscriber terminals, and the second node relays the second lower information rate signal to the subscriber terminals. At least one of the first and second nodes includes a satellite and are separated by 50 miles or more. The first lower information rate signal uses a first frequency range for relaying information to subscriber terminals, and the second lower information rate signal uses a second frequency range for relaying information to the subscriber terminals. The first and second frequency ranges at least partially overlap in time.

In another embodiment, a satellite communication system for wireless communication is disclosed that includes subscriber terminals and a first and second nodes. Each of the subscriber terminals uses antennas and at least some spatial diversity to process signals from the antennas using spatial relationships to differentiate streams. The first node relays a first stream between the ground station and the subscriber terminals, and the second node relays a second stream to the subscriber terminals. At least one of the first and second nodes includes a satellite, and the first and second nodes are separated by 100 miles or more. The first stream uses a first frequency range for relaying information to the subscriber terminals, and the second stream uses a second frequency range for relaying information to the subscriber terminals. Use of the first and second frequency ranges at least partially overlap in time.

In yet another embodiment, a method for communicating with orbital satellite links is disclosed. In one step, a first antenna at a subscriber terminal receives the first stream and the second stream. The first stream is generated by a first node, and the second stream is generated by a second node, where the first and second nodes are separated by at least 200 miles. At least one of the first and second nodes includes a satellite. A second antenna receives at a subscriber terminal the first stream and the second stream. The first stream uses a first frequency range for relaying information, the second stream uses a second frequency range for relaying information, where the first and second frequency ranges at least partially overlap and are used coincident in time. The first and second streams are determined by processing signals from the first and second antennas and analyzing a relationship between the first node, the second node and the first and second antenna to spatially differentiate the first stream from the second stream.

In an embodiment, a satellite communication system for wireless communication is disclosed that includes subscriber terminals and a first and second node. Each of the subscriber terminals uses antennas to receive a first stream and a second stream. The first node relays the first stream between the ground station and the subscriber terminals, and the second node relays the second stream to the subscriber terminals. At least one of the first and second nodes includes a satellite. The first stream uses a first frequency range for relaying information to the subscriber terminals, and the second stream uses a second frequency range for relaying information to the subscriber terminals. Use of the first and second frequency ranges at least partially overlap in time. The first stream relays first information for the subscriber terminals, and the second stream relays second information for the subscriber terminals. The second information includes at least some of the first information and additional information.

In another embodiment, a method for communicating with orbital satellite links is disclosed. In one step, a first antenna at a subscriber terminal receives a first stream and a second stream. The first stream is generated by a first node, and the second stream is generated by a second node. The second stream operates at a higher symbol rate than the first stream. The first node includes a terrestrial base station, and the second nodes includes a satellite. A second antenna at a subscriber terminal receives the first stream and the second stream. Processing of signals from the first and second antennas uses determined spatial relationships to differentiate the first stream from the second stream.

In still another embodiment, a satellite communication system for wireless communication is disclosed. The satellite communication system includes subscriber terminals, a first node and a second node. Each of the subscriber terminals uses antennas to receive a first stream and a second stream. Each of the subscriber terminals is configured to process signals from the antennas using determined spatial relationships to differentiate streams. The first node relays the first stream between the ground station and the subscriber terminals, and the second node relays the second stream to the subscriber terminals. At least one of the first and second nodes comprises a satellite. The first stream relays first information for the subscriber terminals, and the second stream relays second information for the subscriber terminals. The second information includes at least some of the first information and additional information.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Figure 1A:
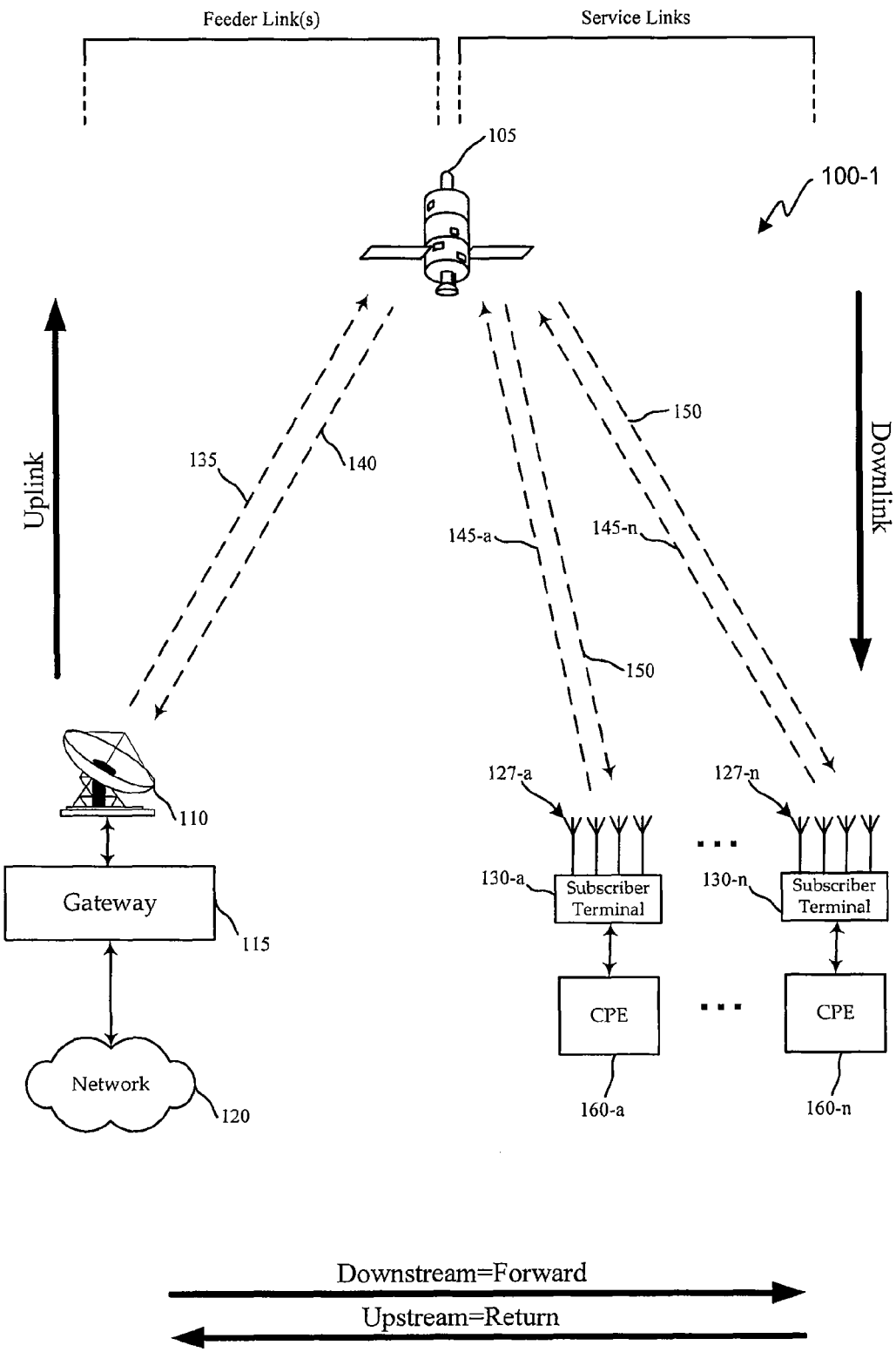
FIGS. 1A through 1D depict block diagrams of embodiments of a satellite system.

Referring initially to FIG. 1A, an embodiment of a satellite system 100-1 is shown. Multiple antennas 127 the subscriber terminal 130 allow MIMO techniques to be used. MIMO systems can operate with both spatial multiplexing and diversity benefits. In this embodiment, a gateway 115 is coupled with a network 120, for example, the Internet. The gateway 115 uses a satellite dish 110 to bi-directionally communicate with a satellite 105 on a feeder link. An forward uplink 135 communicates information from the gateway 115 to the satellite 105, and a return downlink 140 communicates information from the satellite 105 to the gateway 115. Although not shown, there may be a number of gateways 115 in the system 100.

The satellite 105 could perform switching or be a bent-pipe. Information bi-directionally passes through the satellite 105. The satellite 105 could use antennas or phased arrays when communicating. The communication could be focused into spot beams or more broadly, for example, the continental US (CONUS). Satellites 105 have trouble reaching subscriber terminals 130 through foliage or other obstructions. At certain frequencies, even weather and other atmospheric disturbances can cause a satellite signal to fade.

The subscriber terminals 130 in this embodiment are bi-directionally coupled to the satellite 105 to provide connectivity with the network 120. Each subscriber terminal 130 can receive information with a shared forward downlink 150 from the satellite 105, and transmit information is sent on a number of return uplinks 145. Each subscriber terminal 130 can initiate an return uplink 145 to send information upstream to the satellite 105 and ultimately the gateway 115.

This embodiment has multiple antennas on the subscriber terminal 130. The subscriber terminal 130 can be in a fixed location or can be mobile. In this embodiment, the subscriber terminal 130 interacts with a single transceiver in the satellite 105. Other embodiments could allow the subscriber terminal 130 interact with multiple transceivers that maybe oribitally located or non-orbital (e.g., air, ground or sea based). Some embodiments of the subscriber terminal 130 allow switching between these modes.

The physical layer between the satellite and the subscriber terminal operates in SIMO for the downlink and MISO for the uplink. MISO and SIMO are two degenerated cases of MIMO, where MISO has a single transmitter and SIMO has a single receiver. MISO and SIMO are two degenerated cases of MIMO, where MISO has a single transmitter with multiple receivers, and SIMO has a single receiver with multiple transmitters. Generally, MIMO involves multiple transmit and/or receive engines coupled to respective antennas. In various embodiments, the antennas are configured to have independent fading with a spacing distance of ¼, ½ or a full wavelength. The system 100 includes at least one of spatial multiplexing, transmit/receive diversity methods (e.g., space-time coding, code reuse multiple access, etc.), and/or beamforming technologies. Various embodiments can use any number or permutation of these features in implementing the system 100.

Generally, transmission diversity sends some or all of the same information on two distinguishable channels. Physical separation, angular diversity, code division, frequency division, time division, or other techniques can be used to distinguish the channels and increase the gain. Spatial multiplexing generally allows greater throughput by sending partially or fully unique data down a number of channels in parallel. There is an interplay between increases in gain from use of diversity and increases in throughput using spatial multiplexing. For example, diversity can be emphasized to achieve increases in gain at the expense of throughput.

Figure 1B:
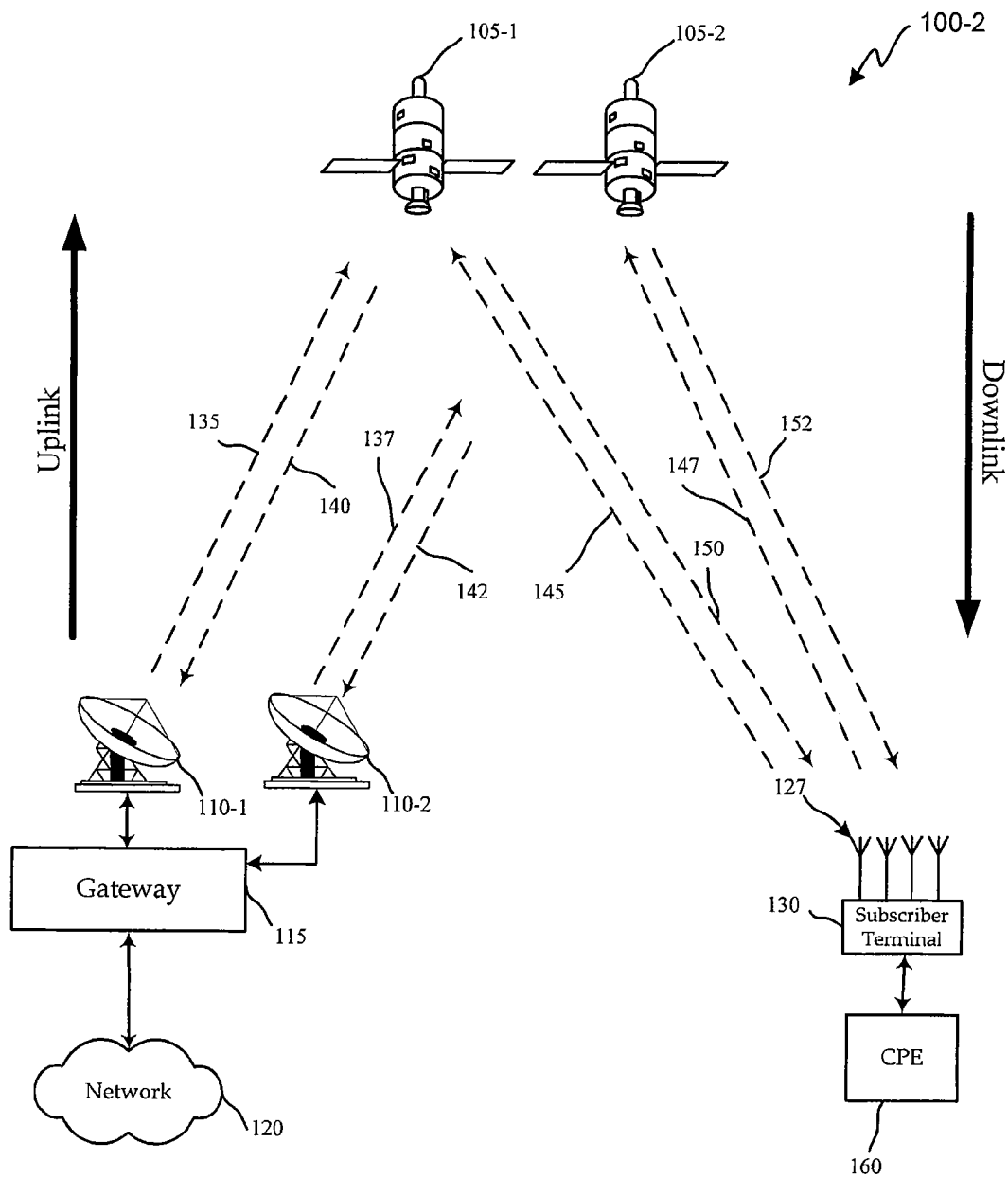

Referring next to FIG. 1B, another embodiment of a satellite system 100-2 is shown. This embodiment has two satellites 105 that act cooperatively as multiple transmitters and receivers in a MIMO configuration. The satellites 105 are geographically separated by orbit or orbital slot, but other techniques can be used to further achieve diversity. Low earth orbit (LEO), geostationary or elliptical orbits may be variously used by the satellites 105.

Figure 1C:
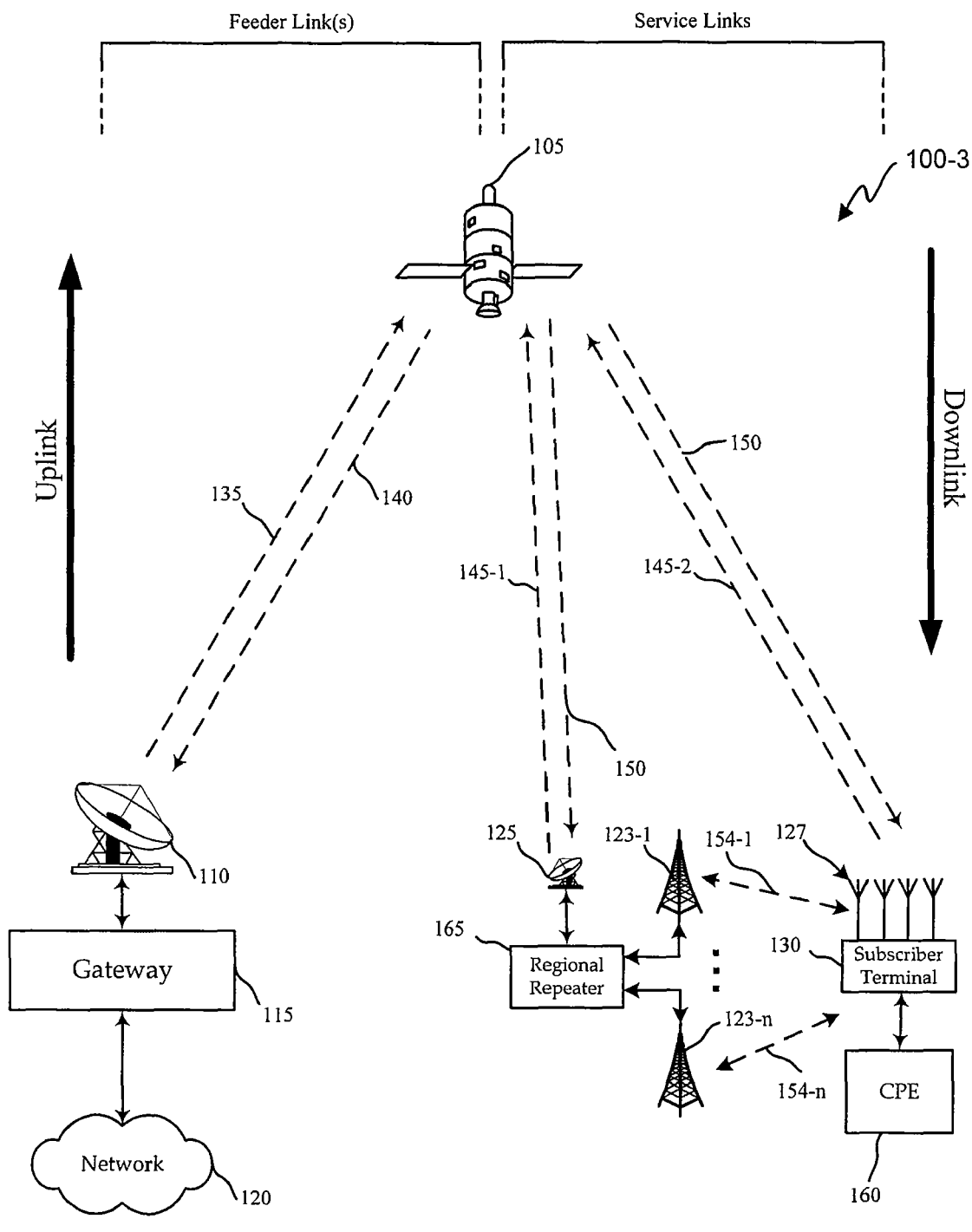

With reference to FIG. 1C, yet another embodiment of the satellite system 100-3 is shown. This embodiment uses a number of regional repeaters 165. The regional repeaters 165 are distributed around to allow enhanced coverage. At any given moment, a subscriber may be able to communicate with a few regional repeaters 165 and/or the satellite 105. A service link between the regional repeater antenna 125 and the satellite 105 allow relaying activity on a terrestrial link(s) 154. Some type of diversity is used distinguish the satellite signal(s) from the repeater signal(s).

The subscriber terminal 130 achieves the benefits of MIMO by using both satellite(s) and regional repeater(s). The regional repeater 165 can be located anywhere sub-orbital (e.g., a balloon, an aircraft, ground-based, on buildings, ship-mounted, etc.). This embodiment shows the regional repeater having a multiple terrestrial antenna 123, but other embodiments could have a single terrestrial antenna 123 for each regional repeater 165. Even though this embodiment only shows a single satellite 105, other embodiments could have multiple satellites 105.

Figure 1D:
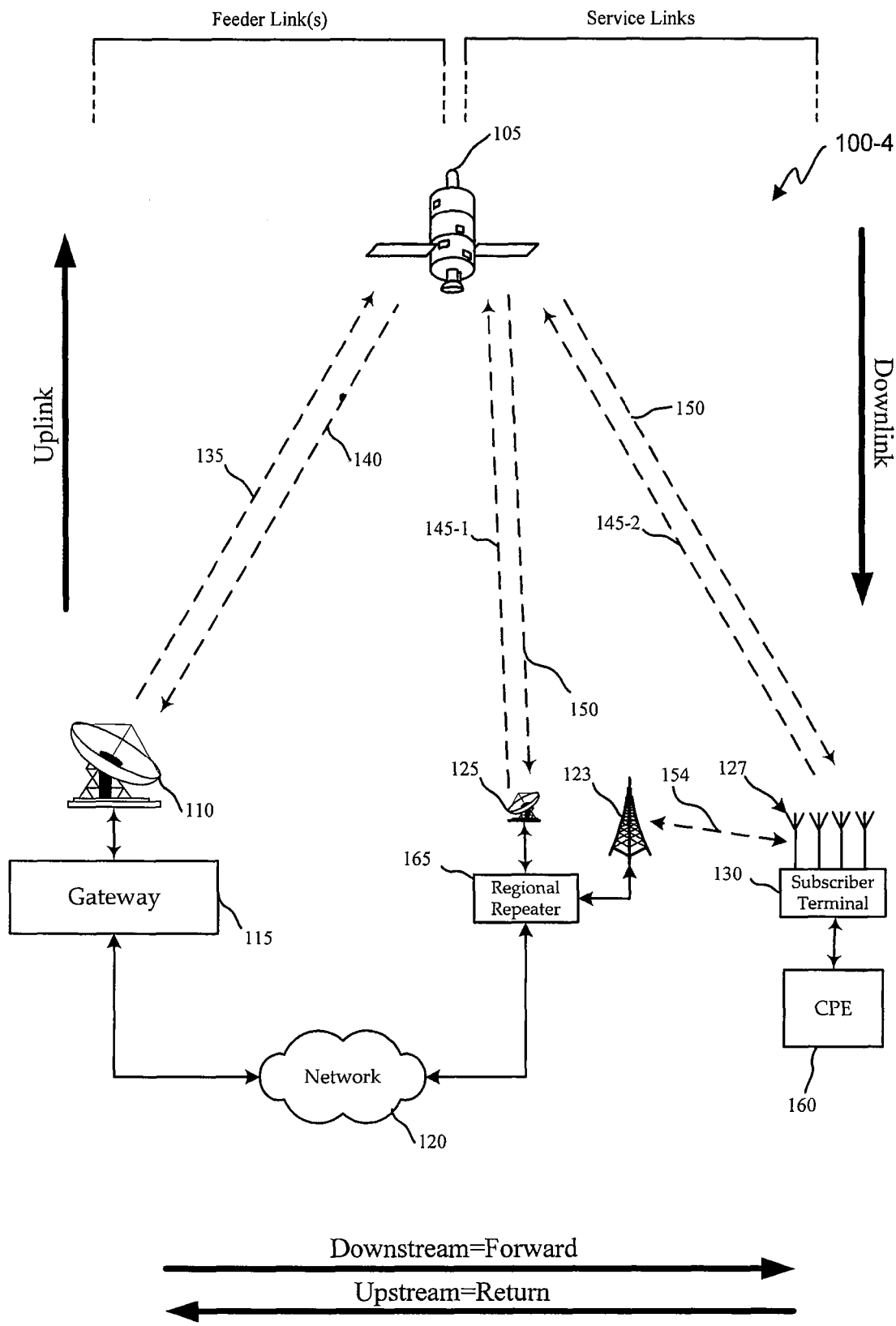

Referring to FIG. 1D, still another embodiment of the satellite system 100-4 is shown. This embodiment uses regional repeaters that can use either a service link 145-1, 150 or a network connection to relay communication of the terrestrial link 154. Each regional repeater 165 in this embodiment uses a single transceiver and antenna 123 for terrestrial communication. An algorithm can divide traffic between the service link and network link when both are available.

Figure 2:
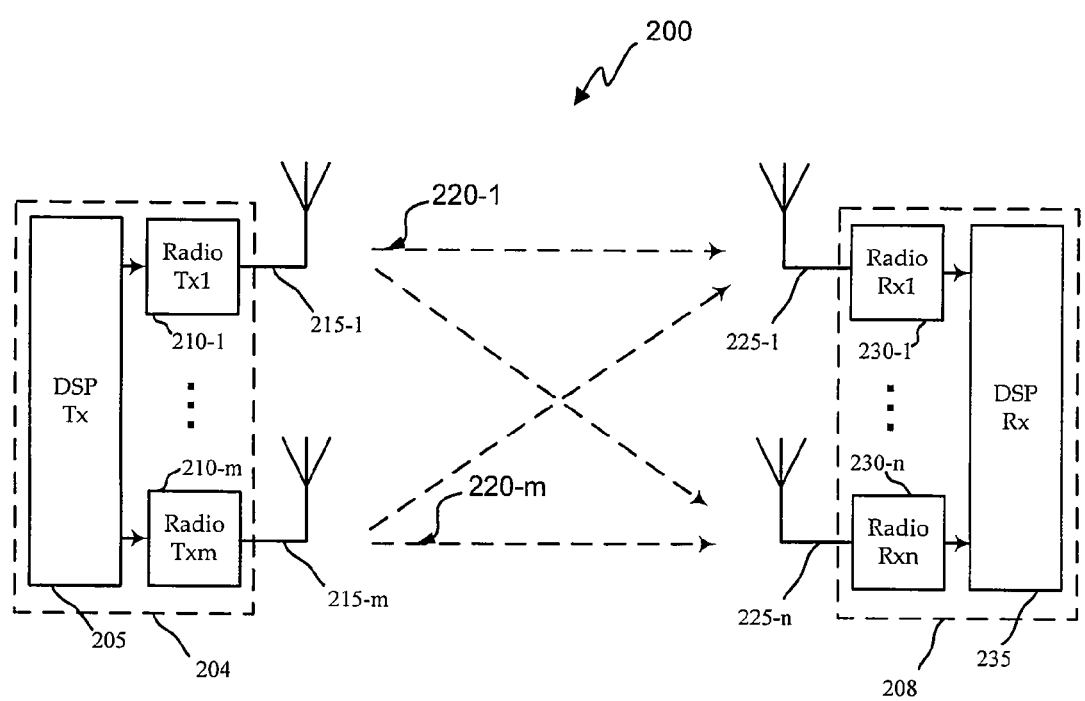
FIG. 2 depicts a block diagram of an embodiment of a system for transmitting information using MIMO.

Turning next to FIG. 2, a system 200 is shown which illustrates a variety of alternative communication schemes that may be leveraged in the system 100 set forth related to FIGS. 1A-1D, for example. The system includes a set of transmitters 204 and a set of receivers 208 that are part of a subscriber terminal 130. The system includes at least two diverse (e.g., spatial, angular, or polarization diversity) antennas 215 for the transmitters 204. In one embodiment, one antenna 215 is on a satellite 105 and the another antenna 215 is at a regional repeater 165. In another embodiment, one antenna 215 is on a first satellite 105 and the other antenna 215 is at second satellite 105. The antennas 215 may, in other embodiments, be one the same satellite.

Each transmit or receive antenna 215, 225 may be made up of one or more individual antenna elements. Each antenna may be fixed or phased array of, for example, monopoles or reflectors, etc. A variety of types of beam forming may be used by adaptively controlling the processing of patterns, orientations, and polarizations to improve performance, as discussed below. Additionally, MIMO techniques such as preceding, spatial multiplexing and/or diversity coding can be used in various embodiments.

In one embodiment, the transmitters 204 process two separate data streams at a transmit digital signal processor(s) DSP(s) 205, and then perform a digital-to-analog (D/A) conversion, upconvert, and amplify each stream using RF transmit radios 210 to create the separate signals 220. Each signal 220 is transmitted at the same time using each respective antenna 215. At the user terminals, diverse (e.g., spatial, angular, or polarization diversity) antennas 225 each receive a copy of each signal 220, and process the signals. RF receive radios 230 amplify, downconvert, and perform A/D conversion, and a receive DSP(s) 235 process each digitized signals. This embodiment uses cross-correlation in the signal processing of the received signals 220.

In one embodiment, various techniques are used (e.g., by the systems 100 of FIGS. 1A-1D) to process data streams. In one embodiment, diversity techniques (e.g., selection combining, equal gain combining, MRC, certain space-time codes, or hybrid methods) are used. In another embodiment, spatial multiplexing techniques may be used to process independent data streams. In other embodiments, spatial multiplexing techniques may be used in combination with diversity techniques and/or space-time codes. A variety of techniques may be used, including various space-time block codes, space-time trellis codes, super-orthogonal space-time trellis codes, differential space-time modulation, decision feedback equalization combined with zero forcing or MMSE (e.g., BLAST architectures), and/or combination techniques.

The above descriptions related to FIG. 2 are examples only. In other embodiments, there may be any combination of M transmit antennas and N receive antennas, where M and N are each greater than or equal to two. Although the description above describes the invention in relation to downstream signals, the description also applies to upstream transmissions as well. For example, transmissions from the subscriber terminal 130 to satellite(s) 105 or from the satellite 105 to the terrestrial antenna(s) 110 can use the invention.

Figure 3:
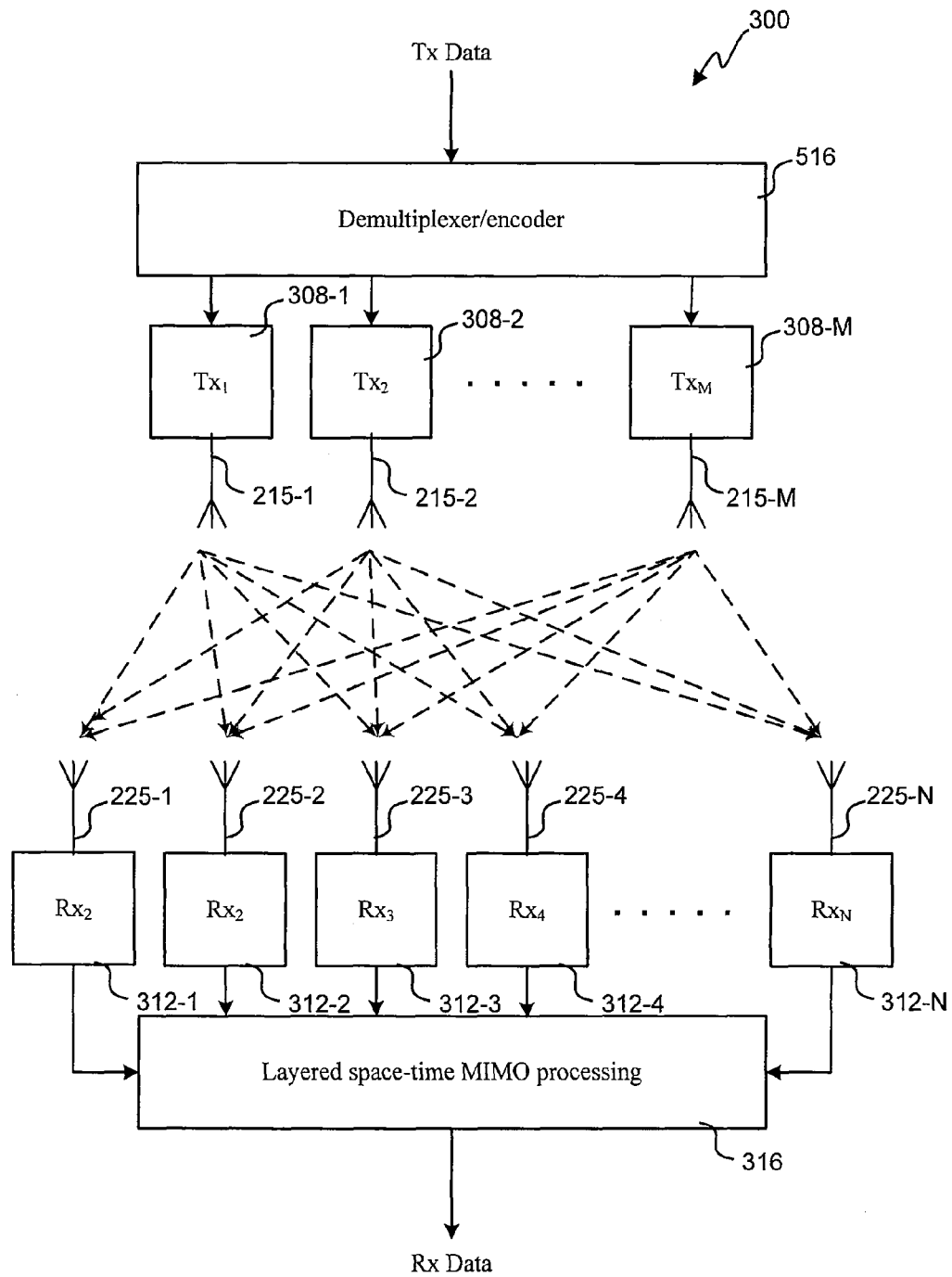
FIG. 3 depicts a block diagram of an embodiment of a MIMO communications system that uses layered space-time processing and spatial multiplexing.

With reference to FIG. 3, a MIMO communications system 300 is shown that uses layered space-time processing and spatial multiplexing according to one embodiment of the invention. The system includes M transmitters 308 with M transmitter antennas 215 and N receivers 312 with N receiver antennas 225. A single higher information rate data stream that is split into M substreams that are respectively encoded with a demux/encoder block 304 before a transmitter 308 sends the signal with a transmitter antenna 215. For example, the substreams may be QAM encoded with space-time block or trellis coding or differential space-time coding. The space-time coding uses redundancy of information on the M substreams increase the link margin. Varying levels of redundancy with the space-time coding can be adjusted to achieve a desired link margin.

Each of the N receiver antennas 225 receives each signal sent from each of the M transmitter antennas. Thus, the receivers 312 in this embodiment collectively receive N multiplied by M signals. The number of transmitter antennas 215, M, may be less than, equal to, or greater than the number of receiver antennas 225 in various embodiments. The layered space-time MIMO processing block 316 recombines the signals and substreams into the higher information rate data stream. Other embodiments may not use space-time coding on the M substreams or may even have complete redundancy on the M substreams.

Figure 4:
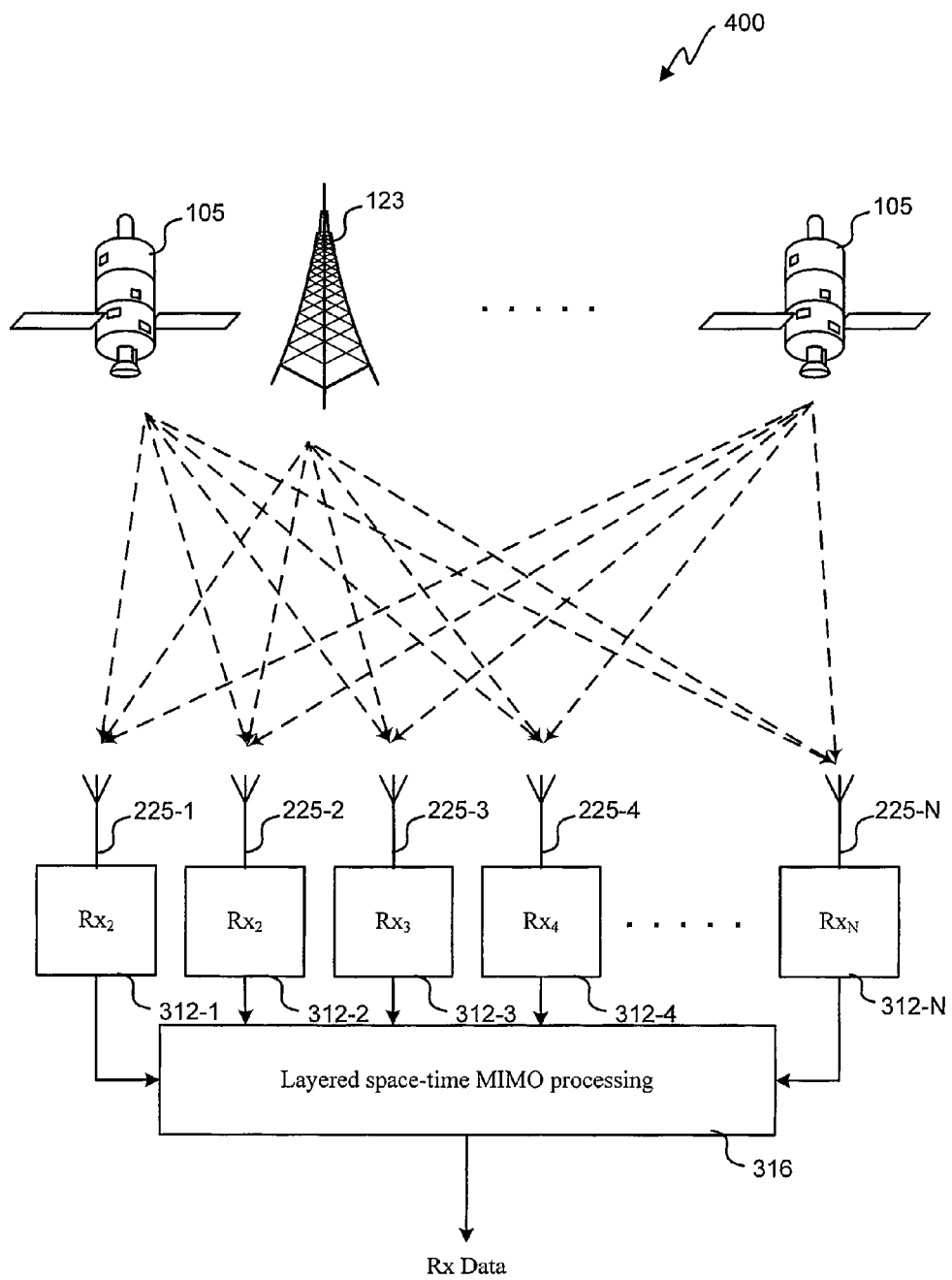
FIG. 4 depicts a block diagram of an embodiment of a MIMO communication system where each of the multiple-output signals are generated from a combination of satellites and terrestrial antenna.

Referring next to FIG. 4, a MIMO communication system 400 is shown where each of the multiple-output signals are generated from a combination of satellites 105 and terrestrial antenna 123 according to one embodiment of the invention. The satellites 105 and terrestrial antenna 123 may be in communication with each other as shown in FIGS. 1B, 1C and 1D. The MIMO communication system 400 may also include only satellite transmitters, as shown in FIG. 1B or only terrestrial transmitters. In such systems, the signals may arrive asynchronously at the receiver terminal. Spatial multiplexing and/or space-time coding may be used in various embodiments.

Figure 5:
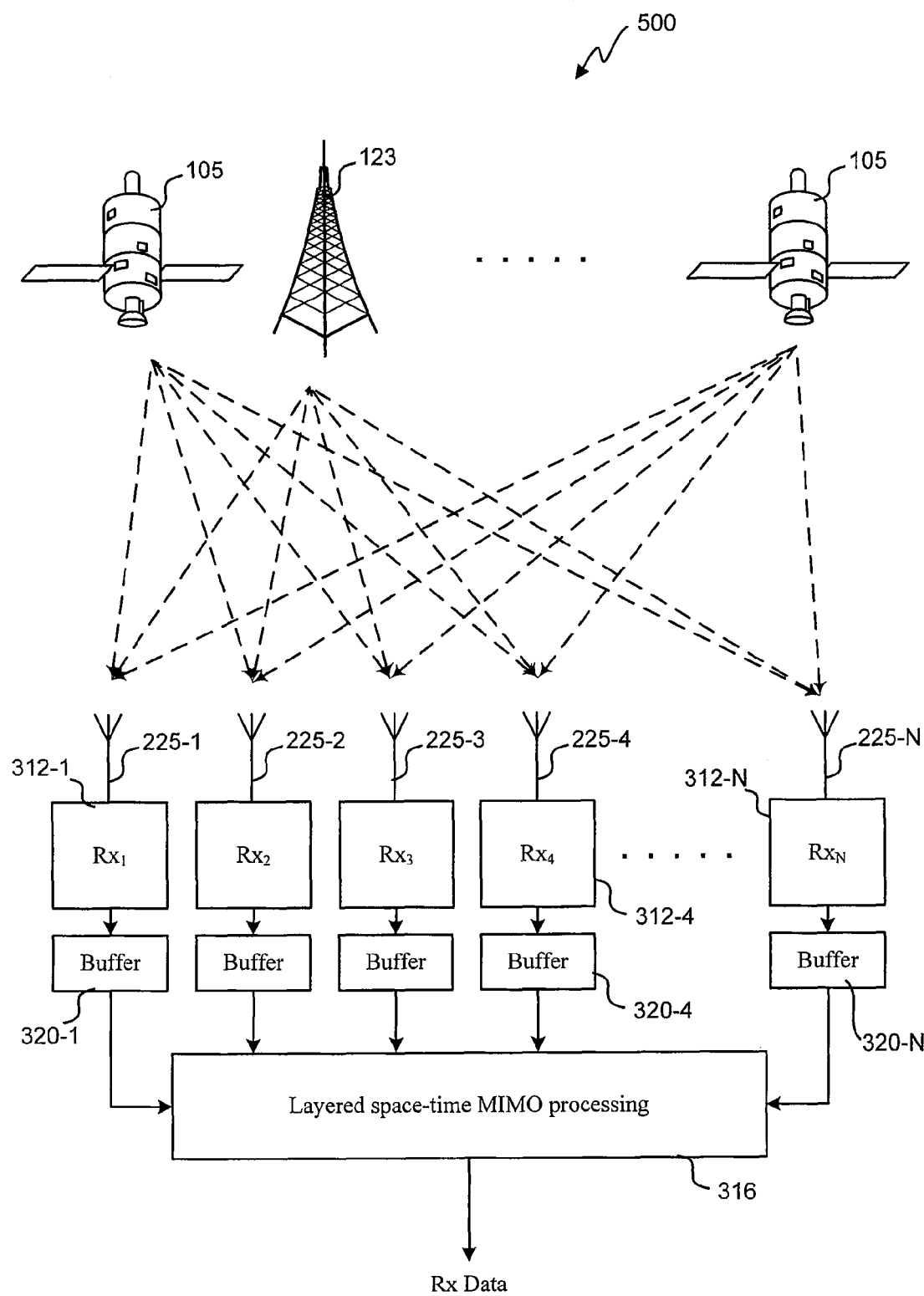
FIG. 5 depicts a block diagram of an embodiment of a MIMO communication system where each of the multiple signals use buffering.

With reference to FIG. 5, a MIMO communication system 500 is shown where each of the multiple signals use buffering according to one embodiment of the invention. Each receiver 312 is respectively coupled to a buffer 320 in this embodiment. A single buffer may be used to store data received from all the receiver antennas 225 in other embodiments. The buffers 320 may be implemented any type of memory such as DRAM, FLASH, etc.

In another embodiment, delays may be added to the signals to synchronize asynchronous signals. The delay used to synchronize the data as it arrives at the receiver may be known or estimated. Delays may be estimated using various estimation techniques, for example, minimum mean-squared errors (MMSE), linear least squared errors (LLSE) or linear minimum mean-squared errors (LMMSE) or Maximum-Likelihood (ML). A trellis routine may also be used to estimate the signal delays.

Figure 6:
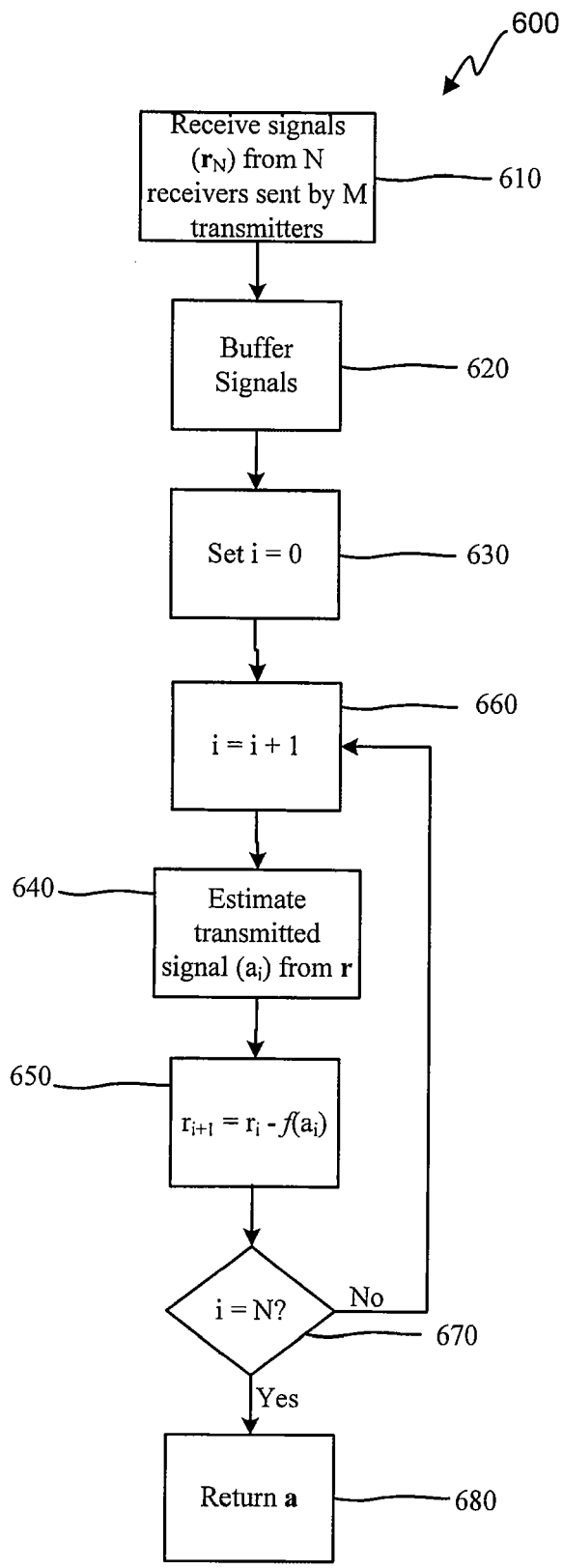
FIG. 6 illustrates a flowchart of an embodiment of an iterative process for extracting the transmitted signals from the received signals.

Referring next to FIG. 6, an iterative method 600 for extracting the transmitted signals from the received signals is shown according to one embodiment of the invention. At block 610, the received signal at each receiver antenna at a given point in time may be considered a vector (r) of length N (where N is the number of receiver antennas). The signals are first buffered in block 620. Buffering can be used, for example, to improve predictive cancellation. At block 630, the indexing integer i is then set: i=0. Upon entry to a processing loop, the indexing integer is incremented in block 660. An estimated value of one of the transmitted signals is generated ($a_i$) 640. This value ($a_i$) may be generated as a function of the received vector (r). A modified value of the next received signal may be determined by nullifying the received signal ($r_i$), that is by subtracting a function of the estimated transmitted signal ($a_i$) from the received signal ($r_i$) 650. This process is repeated using the modified received signal values to create an estimated values of transmitted signal ($a_i$). The estimated transmitted signal is then returned in block 680.

Figure 7:
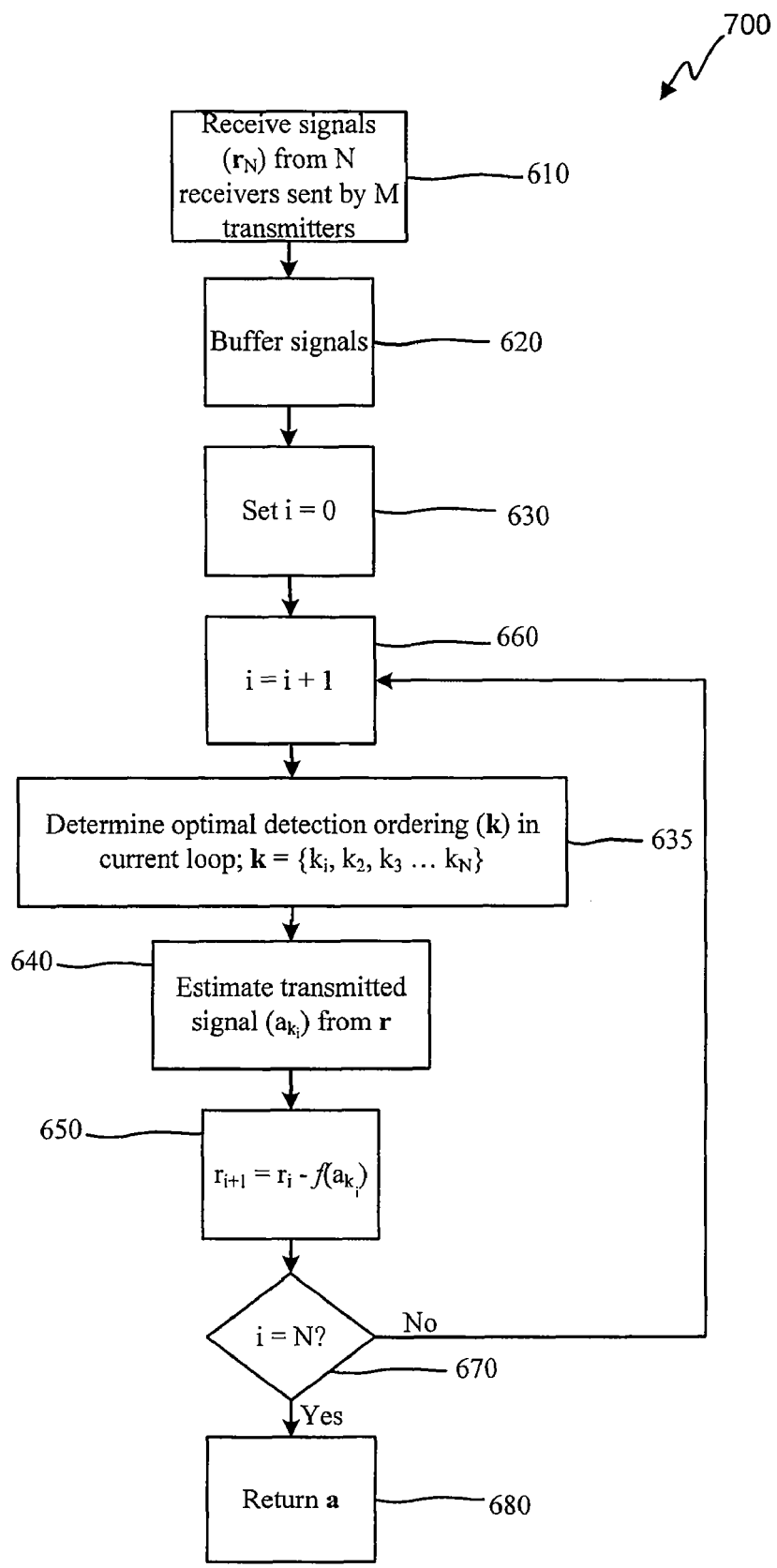
FIG. 7 illustrates a flowchart of an embodiment of another iterative process for extracting the transmitted signals from the received signals.

With reference to FIG. 7, another iterative method 700 for extracting the transmitted signals from the received signals according to one embodiment of the invention is shown. In this embodiment, after receiving the signals in block 610, the signals are buffered in block 620. The iterative integer, i, is set to zero in block 630 and incremented in block 660 upon entry of an iterative loop. An optimal order of estimating and nulling transmitted signals is determined at each layer in block 705. A layer includes $k_i$ through $k_N$ in the current loop. The strongest signal is estimated first and then its contribution to the other signals is cancelled (or nulled). A number of algorithms or routines may be used to determine the optimal ordering. For example, zero-forcing (ZF), minimum mean squared error (MMSE), linear MMSE (LMMSE), maximum a-posterior (MAP), linear least square error (LLSE), or similar mathematical/statistical routines may be applied that return the strongest signal. Combinations of optimization ordering routines may be used. Using the strongest estimated transmitted signals the processes follows in a similar fashion to that shown and described in relation to FIG. 6 above.

Figure 8:
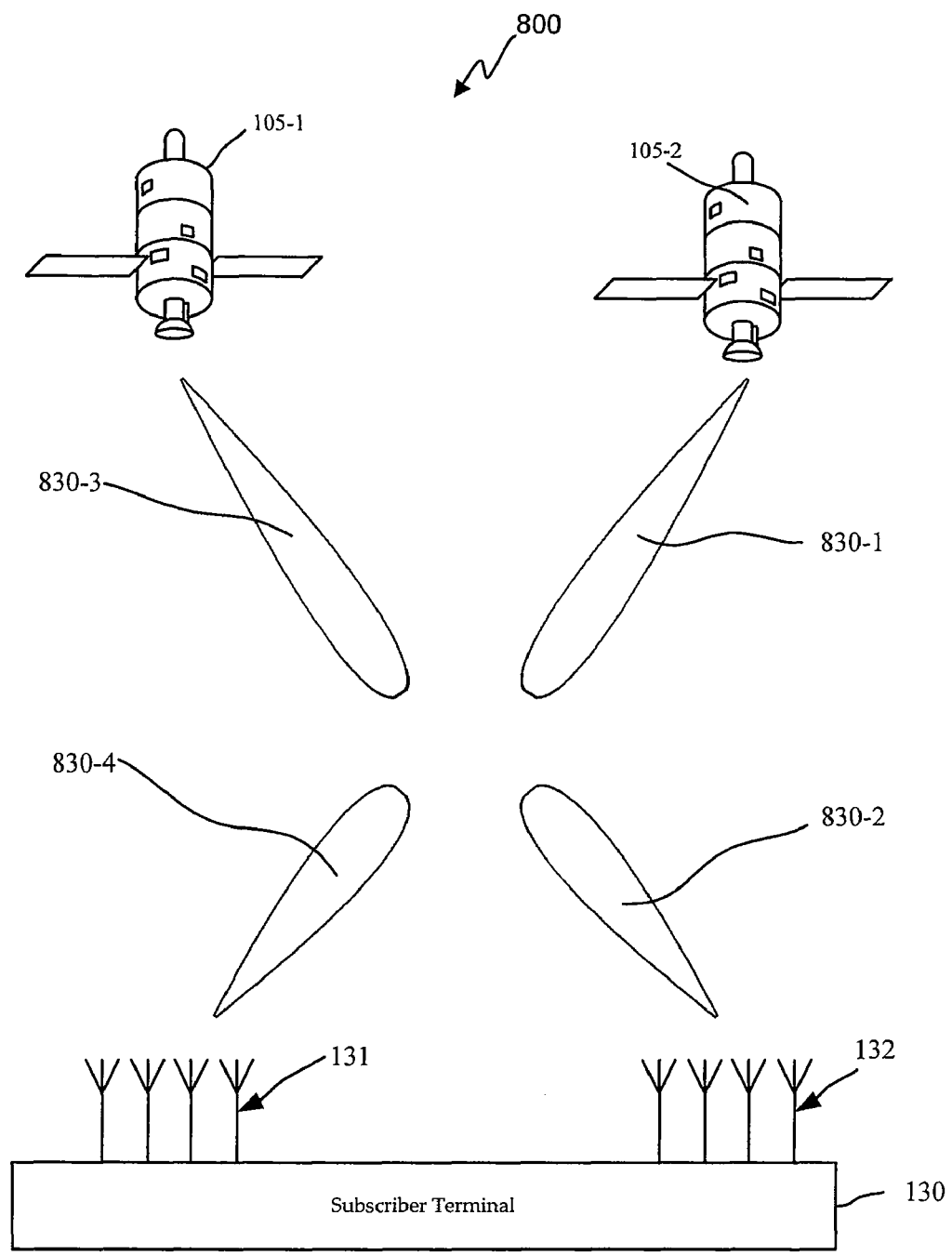
FIG. 8 depicts a block diagram of an embodiment of a MIMO communications system with directional beamforming antenna arrays.

Referring next to FIG. 8, a MIMO communications system 800 with directional beamforming at the satellites 105 and antenna arrays the subscriber terminal 130 according to one embodiment of the invention is shown. Satellites 105 may operate as an array of antennas to directionally produce a transmit beam 830-1, 830-3 in this embodiment. A subscriber terminal 130, may also comprise two arrays of antennas 131, 132, each of which, may independently form a beam 830-2, 830-4 in the direction of the two or more satellites 105. Other embodiments may only do beamforming in the subscriber terminal 130 and not the satellite 105 or vice-versa.

The properties, for example, the phase and amplitude, of the signals sent to each antenna in the array of antennas 131, 132 may be modified in order to increase the gain in a specified direction. A single multiplication with a complex number that modifies both phase and amplitude simultaneously may be used in some embodiments. Because the antennas are at a known distance from each other, the signals transmitted and/or received from each antenna may be sent such that the signals constructively or destructively interfere as desired to produce the intended beam.

The subscriber terminal 130 may also directionally beamform in the direction of a terrestrial antenna 123 according to another embodiment of the invention. The satellites 105 may also directionally beamform in the direction of a gateway 115 and/or regional repeater 165 in some embodiments.

The phase and amplitude of signals sent by the satellites 105 can be modified to produce the beamforming with the two or more satellites 105. Simultaneously, the receiver acquires signals from both satellites 105-1, 105-2. The subscriber terminal 130 processes the signals twice for each receive antenna—first (potentially) nulling out the first satellite 105-1 and then (potentially) nulling out the second satellite 105-2. In this way, beamforming is used in a MIMO communications system 800.

The array antennas may be arranged, for example, linearly, circularly, in a plane, and/or in three dimensions. The individual antennas may be omnidirectional antennas. The individual antennas in the array may be placed a fraction of a wavelength from each other, for example, the antennas may be placed one half a wave length from each other. In various embodiments, the phase and/or amplitude of signals transmitted and/or received at each antenna may not be adjusted, the amplitude alone may be adjusted, or the phase may be adjusted prior to transmission at the antenna.

In the MIMO system 800, any combination of transmitters may use directional beamforming according to embodiments of the invention. For example, two satellites 105 may broadcast signals and a receiver may use an omnidirectional antenna as well as a beam forming array for signal reception. As another example, a single satellite 105 may broadcast a signal towards a large metropolitan area and a terrestrial antenna 123 may beamform in the direction of the large metropolitan area. Moreover, more than two receivers and/or transmitters may directionally beamform.

Figure 9:
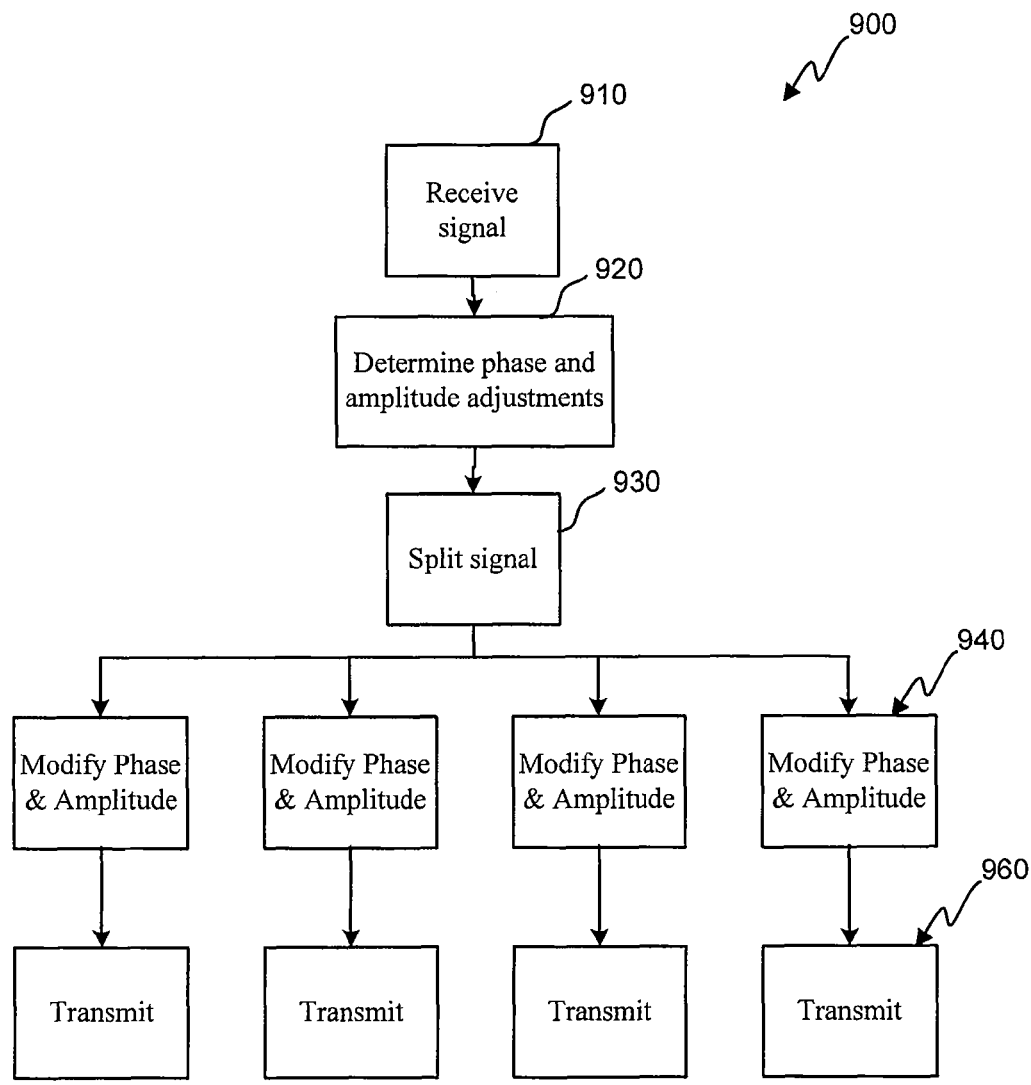
FIG. 9 illustrates a flowchart of an embodiment of a process of signal processing for a beamforming transmitter.

With reference to FIG. 9, a process of signal processing 900 for a beamforming transmitter according to one embodiment of the invention is shown. A signal is received 910 and the phase and amplitude adjustments are determined at block 920 for producing a beam in the desired direction. The phase and amplitude adjustments may be constant, for example, for a system where the beam is static and/or no forming is required. In other embodiments the beam may be steered as the receiver and/or transmitter move relative to each other or to point towards a different transmitter. The adjustments may be time dependent based on known features of the system. The adjustments may also be adaptively determined in real time. Once the adjustments have been determined, the signal is split for transmission among the various antenna within the array at block 930. For ease of discussion only, four antennas are shown in this embodiment and therefore the signal is split into four separate signals for the four antennas. The system may include any number of antennas in various configurations.

Once the signal is split at block 930 the amplitude and phase of each signal may be modified at block 940. Multiplication by a complex number can modify both phase and amplitude simultaneously. The amplitude and phase of each signal may be modified differently, the same, or not at all. Finally, the signals are independently transmitted at block 960. Although this embodiment shows the transmit block as part of one MIMO system 900, the transmit blocks 960 could be between different satellites 105 and/or terrestrial repeaters 165.

Figure 10:
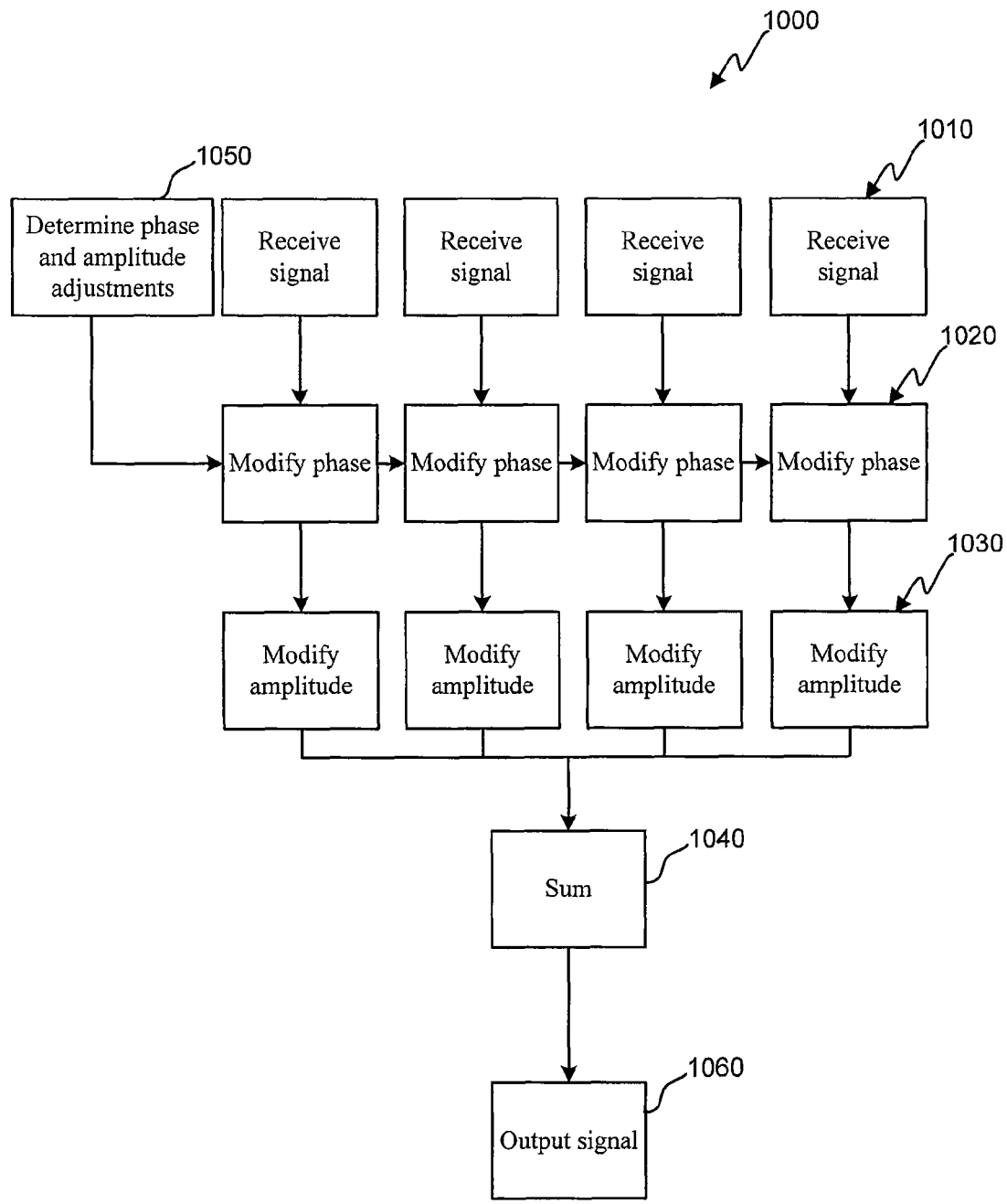
FIG. 10 illustrates a flowchart of another embodiment of a process of signal processing for a beamforming transmitter.

Referring next to FIG. 10, a method of signal processing 1000 for a beamforming receiver according to one embodiment of the invention is shown. Multiple signals are received from multiple antennas at block 1010. In this embodiment, four signals are received at four antennas. The phase and amplitude adjustments may be determined at block 1050. This may occur at various other times throughout the process. The phase and amplitude are adjusted at blocks 1020 and 1030 as separate steps, but could be performed in a single step in other embodiments. The signals are summed at 1040 and then output from the system at block 1060.

Figure 11:
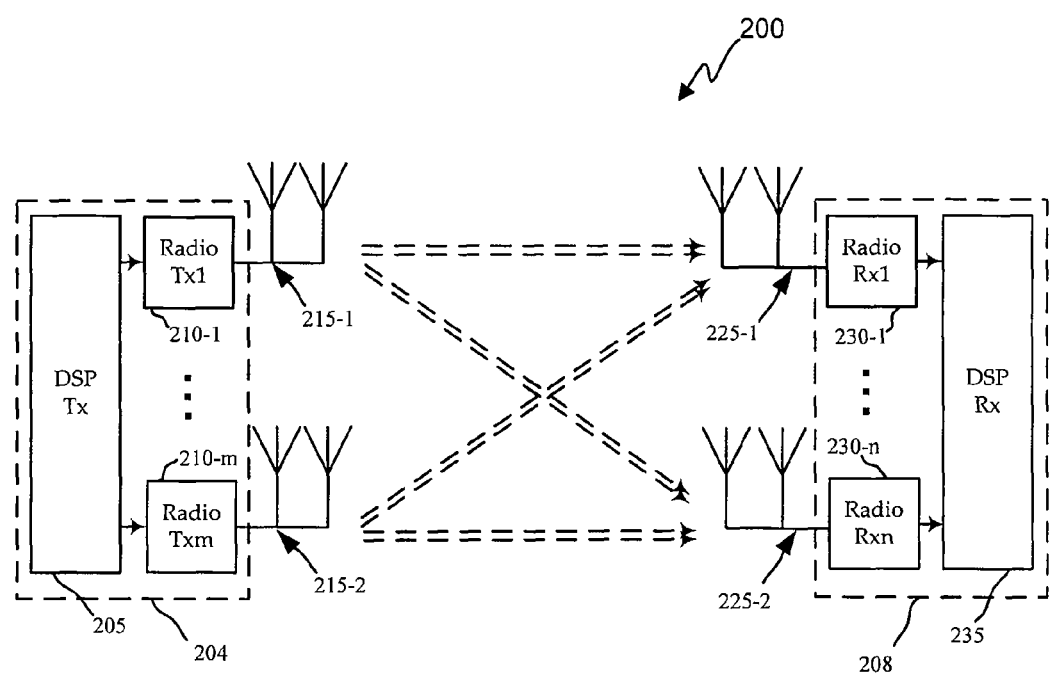
FIG. 11 depicts a block diagram of an embodiment of a dual-antenna dual-polarization system.

With reference to FIG. 11, a dual-antenna, dual-polarization system 200 according to one embodiment of the invention is shown. This embodiment includes two transmit radios 210 and two receive radios 230 that operate in a MIMO fashion. Each transmit radio 210 is coupled to two separate antennas that transmit two signals with independent polarization that are received at the receiver 208 by the receiver dual-polarization antennas 225. Each transmit radio 210 may transmit the same signal on both antenna in two independent polarizations achieving strong spatial and polarization diversity.

In another embodiment, the first dual-poloarization antenna 215-1 may transmit a first signal with right-hand polarization and a second signal with left-hand polarization. The second dual-poloarization antenna 215-2 may also transmit a first signal with right-hand polarization and a second signal with left-hand polarization. In this embodiment, the system achieves both polarization and spatial diversity. In another embodiment, each dual-poloarization antenna 215 sends unique signals with an independent polarization.

Circuitry within the transmit radios 210 may appropriately process the signals for transmission with independent polarization. The transmit radios 210 may send two different signals with different polarization. The transmit radios 210 may also demultiplex a signal and send a substream of data with one polarization and another substream of data with another polarization. In other embodiments the same signal may be transmitted on each of the more than one independently polarized signal to provide polarization diversity.

Figure 12:
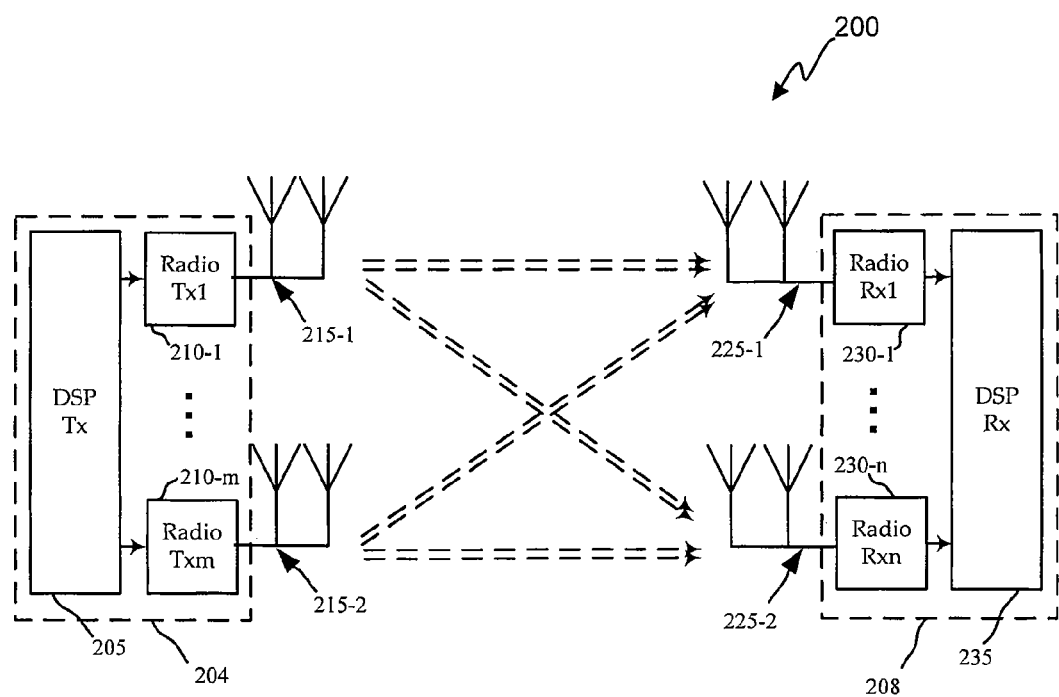
FIG. 12 depicts a block diagram of an embodiment of a multi-antenna dual-polarization system.

Referring next to FIG. 12, a multi-antenna, dual-polarization system 200 according to one embodiment of the invention is shown. This embodiment uses any number of transmit and receive dual-polarization antennas 215, 225, for example, the amount could be any integer between two and ten. There could be an equal amount of transmit dual-polarization antennas 215 and receive dual-polarization antennas 225 or a differing amount in other embodiments. Indeed, any number of dual-polarization antenna 215, 225 could be used in various embodiments. Some embodiments could have more that two polarizations for each antenna 215, 225, for example, three, four, five, six, or eight polarizations.

Figure 13A:
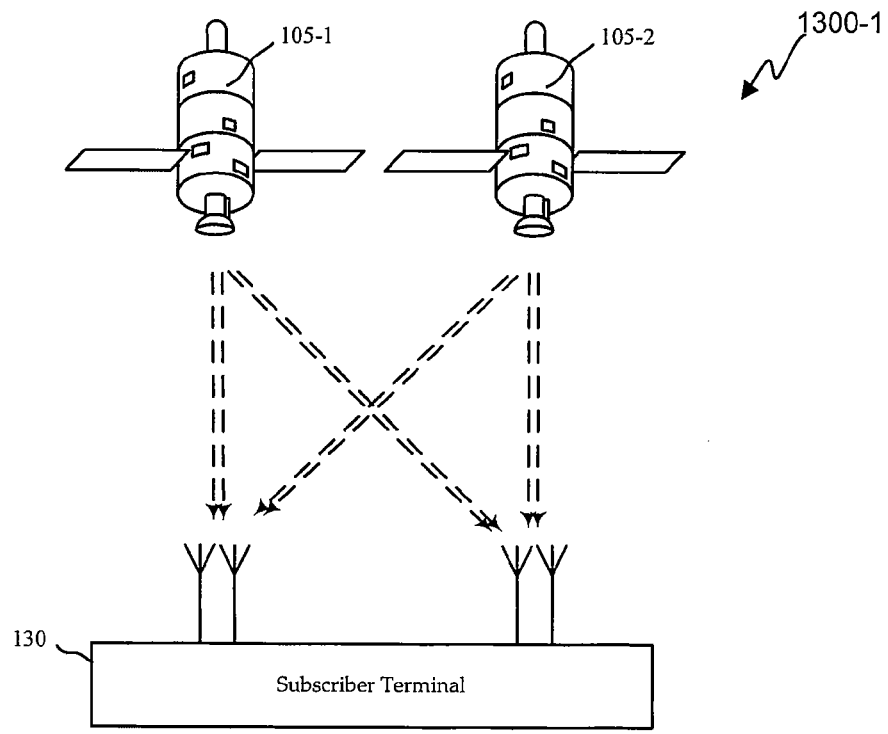
FIGS. 13A and 13B depict block diagrams of embodiments of a dual antenna dual-polarization satellite communication system.
Figure 13B:
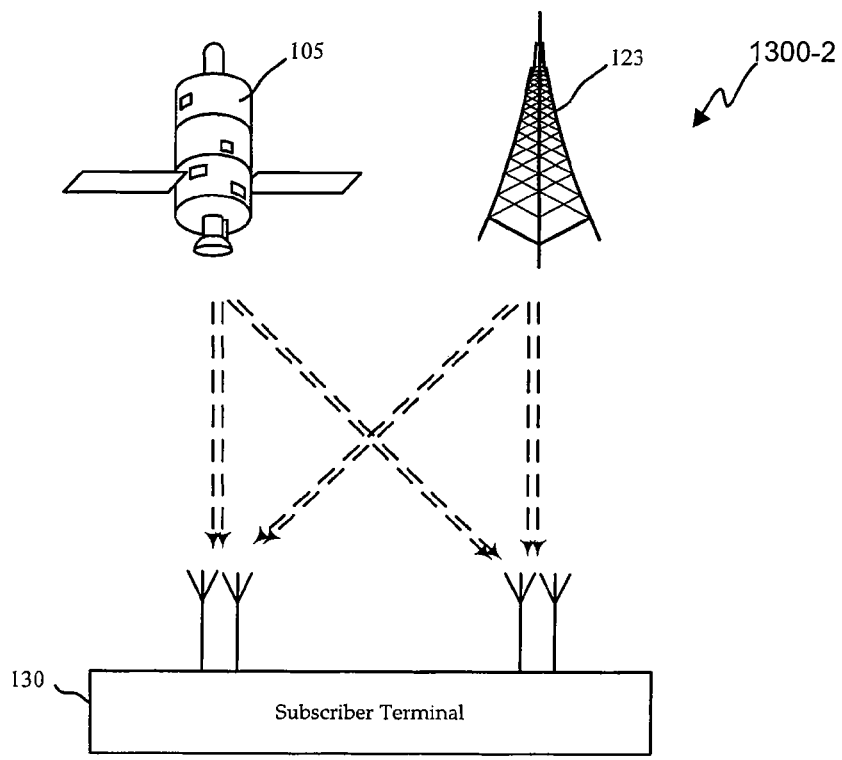

With reference to FIG. 13A, a dual antenna, dual-polarization satellite communication system 1300-1 according to one embodiment of the invention is shown. Two satellites 105-1, 105-2 transmit dual independently polarized signals to a subscriber terminal 130 in this embodiment. Although not shown, each satellite has two antenna for the two polarizations. FIG. 13B shows a dual antenna, dual-polarization satellite 105 and terrestrial antenna 123 according to another embodiment 1300-2 of the invention. In these embodiment, the satellite or terrestrial relays are physically separated but operate in a MIMO fashion. Although not shown, the satellite 105 and the terrestrial antenna 123 each have two antenna to support two polarizations.

I. MIMO Satellite Subscriber Terminal

A satellite system 100 with subscriber terminals 130 that each communicate bi-directionally through a relay, for example, a satellite 105 or regional repeater 165. Each subscriber terminal 130 has two or more transceivers each with a separate antenna 225 that operate cooperatively in a MIMO fashion using precoding, spatial multiplexing, spatial diversity, and/or diversity coding. In one alternative, the MIMO link includes regional repeaters 165 in addition to a satellite(s) 105 at the end of the link away from the mobile subscriber terminals 130. In this alternative, the regional repeaters 165 can be separated by miles. In one embodiment, the subscriber terminals 130 are mobile, but they could be fixed or be some of each type. In embodiments with two geosynchronous satellites, each satellite is in a different geosynchronous orbital slot (e.g., more than 1 or 2 degrees of separation).

In one embodiment, MIMO is used to gather additional multipath energy. Additionally, some embodiments could use MIMO to get diversity gains. A given MIMO link can include paths from one or more satellites 105 and/or one or more regional repeaters 165. At least some of the transceivers on at least one end of the MIMO link are separated by miles. In any event, the receiver has a number of receive antenna 225 that receive signals from a number of transmit antenna 215. Those antenna 215, 225 may be spaced to allow different spatial signatures such that the receiver(s) can recover the signals separately using cross-correlation, for example.

Mobile subscriber terminals have blockage and aiming issues. Getting a direct link to the satellite is often difficult in conventional systems. One embodiment allows use of multiple transceivers at the subscriber terminals 130. The antennas 127 for each transceiver are spaced to prompt independent fading. MIMO processing allows greater availability of the link for these subscriber terminals 130. The subscriber terminal is two-way in one embodiment and optionally mobile.

II. Base Station Reduction in Mobile Satellite Systems

A hybrid satellite 105 and regional repeater 165 system 100 that uses MIMO. A subscriber terminal 130 simultaneously uses both the satellite 105 and regional repeater 165 to communicate with a network 120 using MIMO. CONUS (or a similarly sized area) availability would be over 99% (alternatively, 98%, 99.5%, 99.9%, 99.99%) with less than 1,000 (alternatively, 2,000, 1,500, 800, 500, 200) regional repeaters. For other geographic areas, a similar ratio between regional repeaters and area could be maintained. In this embodiment, there could be one or two satellites 105 in geosynchronous orbit.

Conventional satellite systems use ground-based base stations or regional repeaters to increase coverage. To receive extensive coverage, many thousands of base stations are required for conventional systems. In one embodiment, MIMO is used to reduce the number of regional repeaters. Embodiments may have one, two or more satellites 105 in addition to the regional repeaters 165 will allow collection of more of the signal without use of as many base stations.

III. Satellite Terrestrial Hybrid with Additional Content on Terrestrial

A satellite system 100 with orbital and non-orbital relays, for example, regional repeaters 165. Repeating first or primary data on both the orbital and non-orbital links. Adding second or additional data to only one of the orbital and non-orbital links. The first data is used to produce a diversity gain with the two links. Additionally, spatial multiplexing could be used with the orbital and non-orbital relays. In some embodiments, the same frequency could be used for the orbital and non-orbital links.

The regional repeaters 165 could optionally have additional data encoded on the terrestrial link 154. The additional data could allow for location specific customizations, for example, advertisement relevant to subscriber terminals 130 within communication range of the regional repeater 165. Some embodiments could determine a location of the subscriber terminal 130 to greater precision than just what is in communication range. The location relevance could be tuned accordingly. The additional data could be a function of location and/or a user profile. The additional data could be at least 10%, 25%, 50%, 100%, 150%, or 200% of the size of the primary data.

Some embodiments could allow higher quality of service (QoS), higher-order coding, and/or additional content as the additional information. Some embodiments could use the terrestrial link 154, when available, to get information that benefits from low latency, but uses the satellite link for information more tolerant to latency, for example, movie downloads.

When the additional information is available, more detailed content (e.g., higher resolution, greater sampling, better frame rate, larger dynamic range, more advanced coding) could be sent to take advantage of the extra bandwidth. This could be done by replacing the signal with a different one or just augmenting the signal, for example, by adding more frames or samples. The additional information could be received over the satellite link as in the embodiment of FIG. 1C or could be from another link to the network 120 as with the embodiment of FIG. 1D.

The additional information could travel on the same frequency as the satellite link in one embodiment. Higher-order signaling could be used in one embodiment in a way that stays synchronized with the satellite link to still allow diversity gains. The regional repeaters 165 could relay the satellite link with additional modulation to hold the additional information. Some embodiments could re-encode the satellite information with additional information using different modulation at the same frequency. The re-coding could be done with or without bringing the satellite signal to baseband. In one embodiment, hierarchical modulation is used to add the additional coding.

In one embodiment, a satellite/terrestrial hybrid system 100-3 has satellite-user service links 145, 150 that share the same frequency as the terrestrial link 154. MIMO processing is used to resolve distinct signals and data patterns on each link. A hierarchical modulation method is one way to add the additional data to the terrestrial retransmission of the service link while still retaining some ability to do coherent MIMO combining methods on the satellite and terrestrial links. Some embodiments could also use a modulation scheme for the terrestrial links 154 (e.g., OFDM) but use the same FEC code for both links and soft combine them at decoder input. For the subscriber terminal return link, data bound for the regional repeater 165 and the satellite 105 is multiplexed. In addition, the regional repeater 165 acts as a repeater for the subscriber terminal return transmission.

In one embodiment, a base station or regional repeater 165 produces additional or local data over a terrestrial link 154 and does not retransmit the data from the satellite forward downlink 150. MIMO processing could be used to resolve the two received signals from the base station and the satellite 105 despite use of the same or overlapping frequency ranges. In this configuration, the satellite 105 is the source of global or national broadcast data and the base station is the source of additional or local content.

In another embodiment, the spectrum could be reused a third time using two types of base stations. A first type of base station acts as a terrestrial repeater 165 for the satellite signals—again using MIMO processing to resolve the multiple signals. A second type of base station produces additional content instead of repeating the satellite link. The additional content could come from a wired, optical or wireless link to the network 120. One type of wireless link could be through a channel on the satellite 105.

A further embodiment offers two-way broadband service via the terrestrial link 154 and broadcast service via the satellite 105 using the same or overlapping spectrum for each service on the forward link. MIMO with spatial diversity can be used to resolve the two signals sharing at least some of the same spectrum. A regional repeater 165 could be added for the satellite signals and use MIMO to resolve the multiple signals. Because of low bandwidth satellite return link requirements in some embodiments, the satellite-bound and base station-bound return signals can be multiplexed via FDM, TDM and/or CDM in any combination.

IV. Use of Different Coding and Modulation for Satellite MIMO

In this embodiment, a satellite subscriber terminal 130 operates with a plurality of transceivers. The plurality of transceivers act together in MIMO mode that includes spatial multiplexing. At a given moment, two different modulation/coding combinations are used by the plurality of transceivers. In one alternative, a first modulation/coding combination is used for a satellite link and a second modulation/coding combination is used for a terrestrial link.

The different coding and/or modulation could be adaptively selected on both the uplink and downlink. At a given moment, the mobile subscriber terminal 130 may be in range of a regional repeater 165. When a terrestrial link 154 is available, a higher order coding could be used than what would normally be done for the satellite 105, for example. Adaptations to the modulation and coding can operate independently on the terrestrial and satellite links as those channels change. In one embodiment, coding on the uplink could gradually change due to weather or other fading.

Modulation and/or code points for each transceiver could change independent of others. Spatial multiplexed transceivers could adapt independently of the others. At a given moment, there could be a variety of modulation and/or code points being used by the various transceivers.

V. Satellite Terrestrial Hybrid Using Same Frequency and MIMO

In this embodiment, a MIMO link uses transceivers separated on at least one end of the link by miles (e.g., 25, 50, 100, 200, 500, 750, 1000 miles or more). The transceivers include at least one orbital and at least one non-orbital. A first frequency range of the orbital transceiver at least partially overlaps with a second frequency range of the non-orbital transceiver. The orbital and non-orbital transceivers send at least some of the same data on the MIMO link.

Various embodiments use a hybrid of satellite(s) 105 and regional repeater(s) 165 to allow subscriber terminals (ST) 130 to communicate with the network 120. For example, the embodiments of FIGS. 1C and 1D show MIMO use in the system 100. A link with the network 120 simultaneously communicates with both the satellite 105 and the regional repeater 165 using the same frequency. The regional repeater 165 is a relay of the satellite service link.

The satellite link and the regional repeater link use diversity. Diversity can be achieved with coding, spacing of multiple antenna, time, frequency, and/or polarization. In any event, either spatial diversity and/or spatial multiplexing are used in this embodiment. The regional repeater 165 could implement diversity without digitally decoding the signal or could perform digital decoding before remodulating for the terrestrial link. The frequency ranges of the satellite link and the regional repeater link at least partially overlap or are coextensive. The data between the satellite link and the regional repeater could be completely the same or only partially the same. For example, the regional repeater could have additional information. The satellite and terrestrial signals have independent fading that could allow spatial multiplexing.

For the present system 100, the regional repeater 165 and/or multiple satellites 105 introduce additional delay in the MIMO system 100. Multiple satellites 105 could have their transceivers separated by miles and the regional repeaters 165 separated by even greater distances. The receiver can use buffering to allow processing a larger time slice to gather and process the various signal paths. For example, the delay could be 2, 4, 8, 12, 16, 20, 50, 100, 200, 500 or more symbols.

VI. Two Satellites on Same Frequency to MIMO Subscriber Terminals

In another embodiment, a communication system 100 utilizes a first satellite 105 and a second satellite 105 that are physically separated from each other. The separation is miles. The first satellite 105 has a first link with a subscriber terminal 130, and the second satellite 105 has a second link with the subscriber terminal 130. At least some data on the first and second links is the same. The subscriber terminal 130 combines the data from the two sources for diversity gain.

One embodiment communicates between n transceivers (e.g., n=2, 3, 4, 5, 6, 7, 8, 12, etc.) of a subscriber terminal 130 and two or more satellites 105 as shown in FIG. 1B. In this system 100-2, the direct propagation distance is very different because of the physical separation of the satellites 105. The satellites 105 are separated by miles (e.g., 2, 5, 10, 20, 50, 100 or more miles), but act cooperatively to transmit at least some of the same data. MIMO techniques can be used by the subscriber terminal(s) 130 on the two satellite links to achieve diversity gains. Like the hybrid case depicted in FIGS. 1C and 1D, the embodiment of FIG. 1B can have large differential delays due to path differences. The different paths could be off by a one symbol or hundreds.

VII. Layered Space-Time Processing

In one embodiment, the present disclosure provides for a satellite system 100 for extracting signals transmitted from a plurality of transmitters and received at a plurality of receivers in a multiple input multiple output (MIMO) communications system. The signals may be transmitted from one or more satellites 105 and/or base station repeaters 165. Spectral efficiencies of 1-60 bits per second per Hertz may be achieved with embodiment of the invention. Other embodiments may result in efficiencies of 10-20 or 20-40 bits per second per Hertz.

In another embodiment, the present disclosure provides for systems for synchronizing asynchronous signals for layered space-time processing. The system may provide delays in a signal prior to transmission, in a repeater or by the receiver. The system may also buffer the received data to allow for improved predictive cancellation. In yet another embodiment, the present disclosure provides for a system for performing layered space-time processing for asynchronous signals.

VIII. Directional Beam Forming

In one embodiment, the present disclosure provides for an electronically directed antenna array with a transmit and/or receive beam that is electronically pointed in a specific direction without physically moving the antenna array. The array of antennas may be directed in at least one direction and may be used in conjunction with other antenna arrays.

In one embodiment of the invention, a beam may be steered by adjusting the properties of the signal received and/or transmitted at each individual antenna. For example, the phase and amplitude of the signal sent to each antenna may be adjusted. The adjustments may depend on the desired direction of the transmitted and/or received signal, the number of signals, the polarization of the signals, the distance between the antennas, the power of the antennas, etc. Steering may be adaptive by applying least mean squares (LMS), minimum mean-squares error (MMSE), maximum signal-to-interference ratio (MSIR), minimum variance, normalized LMS (NLMS), and recursive least squares (RLS) algorithms to the signal properties received and/or transmitted at the antenna.

Embodiments of the invention may apply beamforming to digital and/or analog signals and may include an antenna array that beamforms in multiple directions.

In one embodiment of the invention beamforming may be used in satellite and/or terrestrial communication systems. Beamforming systems may be implemented as receivers and/or transmitters, repeaters, for example, on a satellite, an automobile, a train, an airplane and/or, a terrestrial location such as a house, an office building, etc.

In one embodiment of the invention, beamforming systems may be polarization dependant or independent. A beamforming system may maximize the gain of a beam in at least one direction for signals with a specific polarization and minimize the gain of a beam for signals of other polarizations.

IX. MIMO Antenna with Polarization Diversity for Satellite Communications

In one embodiment, the present disclosure provides for a multiple-input multiple-output (MIMO) communications system 100 operating with two independently polarized signals. The independently polarized signals may increase the transmission rate and the robustness of the communication system by providing both polarization diversity and spatial diversity.

Receivers and transmitters may include wireless internet modems or routers, cell phones, cell phone towers, wireless internet cards, satellite radio receivers and transmitters, satellite phone systems, satellite television systems, military communications, and the like.

The signals received from different transmitters may be synchronous or asynchronous. Buffers may be used to store received asynchronous data prior to processing and synchronization.

X. Delay Tolerant MIMO Using Rolling Pilots

In another embodiment, a communication system 100 uses MIMO to improve link margin. On one end of a communication link, transmitters are separated by miles. The delay spread for the MIMO channel is greater than a frame size. Different headers are used for adjacent frames.

Preambles or headers are used to synchronize frames. Pilots are used for channel estimation, synchronization and other purposes. Knowing when a frame begins is used in decoding data. Conventional systems repeat the same header for this purposes. In one embodiment, diversity is achieved with any number of satellites 105 and/or regional repeaters 165. MIMO is achieved using distantly distributed transceivers in these satellites 105 and/or regional repeaters 165.

In some embodiments, the delay spread can exceed the size of the data frame. In one embodiment, there are a number of headers that are used on a rolling, varying or random cycle. The number of headers used can be a set number or a number (e.g., 2, 4, 8, 16, 32, 64, 128, etc.) that is chosen based upon the largest anticipated delay spread. For example, where the delay spread could be three frames, four different headers could be used. In this way, the multiple paths can be discerned. Buffering at the receiver can hold enough of the frames from the various paths such that the meaningful information from the paths can be used in decoding the signal.

In one embodiment, the pilots could roll in a manner similar to the headers. In a given implementation, pilots could roll and/or headers could roll. The pilots would roll to change over time to allow synchronization of the various paths in the link. The number of variations in pilots could be chosen to support the delay spread for a given application.

XI. Satellite MIMO System Enhancements

The invention relates to a multi antenna satellite systems 100 with multiple antennae at the receiver and/or multiple transmitters. The multiple transmitters could consist of multiple satellites or a single satellite and ground repeaters or a combination thereof. The multiple antenna at the receivers could consist of multiple antennas with a fixed separation between them (such as multiple antennas fixed on top of a car roof), or multiple antennas in an ad-hoc network. One challenge of Satellite MIMO systems is the relative path delay difference between the multiple transmitters (be it multiple satellites or a mixture of satellites and ground repeaters).

The following sections describe various receiver structures that might be used by such a multiple antenna system. In this section, it is assumed that the additive noise is Gaussian and so no distinction is made between the Minimum Mean Squared Error (MMSE) solution and the Linear-MMSE (LMMSE) solution. As is well known, the LMMSE solution and the MMSE solution are the same for Gaussian noise.

A. MMSE Receivers—Same Content on Multiple Tx—Path Difference is an Integer Multiple of Symbol Time In this section, we discuss multiple antenna receivers working with multiple transmitters. The multiple transmitters could be a satellite(s) and a ground repeater(s) (as shown in FIGS. 1A-1D), or could be multiple satellites or combinations thereof.

If the same content is being repeated on two transmitters, then the received signal (after rx matched filtering and downsampling to symbol rate) may be written as:

$$r[n] = H_1 x[n] + H_2 x[n-\delta] + n[n] \qquad (1)$$

where the M×1 vector r[n] contains the samples received at each of the M receive antennae after downsampling to symbol time. x[n] is the data symbol transmitted from the first transmit antenna at time n. The two antennas have a path difference which results in a delay of δ symbols. Here we have assumed that δ is an integer number of symbols. Below, we develop a theory for the case when δ is not an integer number of symbol times. $H_1$ and $H_2$ are the channel gains from the first and second transmitters respectively to the receiver array. Thus if there are M receive antenna, $H_1$ and $H_2$ are both M×1 complex vectors. We have assumed without loss of any generality that the first transmitter has a shorter path to the receiver.

Under such a system, assuming the channel gains and the noise power is known, the minimum mean square error (MMSE) estimate of x[n] is given by:

$$\widehat{x[n]} = R_{xr}(R_{rr})^{-1} r[n] \qquad (2.a)$$

$$= H_1^H (H_1 H_1^H + H_2 H_2^H + \sigma_n^2 I)^{-1} r[n] \qquad (2.b)$$

where $()^H$ indicates Hermitian and $\widehat{()}$ indicates the estimate. Eqn. 2.b assumes that x[n] and x[n−δ] are uncorrelated, that the noise is white both spatially and temporally and that the channel gains are constant over time and are known to the receiver.

It may be observed that in this example, x[n] is estimated using the observation vector at time n. However, gains may be obtained by increasing the window of observation. Suppose y[n] is obtained by stacking the received vectors at various times as shown below:

$$y[n] = \begin{bmatrix} r[n]-\delta \\ r[n] \\ r[n+\delta] \end{bmatrix} \qquad (3.a)$$

$$= \begin{bmatrix} 0 \\ H_1 \\ H_2 \end{bmatrix} x[n] + \begin{bmatrix} H_2 \\ 0 \\ 0 \end{bmatrix} \qquad (3.b)$$

$$x[n-2\delta] + \begin{bmatrix} H_1 \\ H_2 \\ 0 \end{bmatrix} x[n-\delta] + \begin{bmatrix} 0 \\ 0 \\ H_1 \end{bmatrix} x[n+\delta] + n$$

$$= Px[n] + Qx[n-2\delta] + Rx[n-\delta] + Sx[n+\delta] + n \qquad (3.c)$$

In this case, the MMSE estimate of x[n] given observation y[n], is given by:

$$\widehat{x[n]} = R_{xy}(R_{yy})^{-1} y[n] \qquad (4.a)$$

$$= P^H (PP^H + QQ^H + RR^H + SS^H + R_{nn})^{-1} y[n] \qquad (4.b)$$

If the autocovariance matrix, $R_{yy}$, of the observation vectors is singular, then the pseudo-inverse should be used instead of the inverse. However, it is unlikely that this matrix will be singular in the presence of a non-zero amount of noise. The autocovariance matrix of the noise, $R_{nn}$ may be assumed to be an identity matrix scaled by the noise power.

This process, can of course be generalized using wider windows. Additionally, the two transmitters may only partially repeat the same content in other embodiments.

B. System Requirements for Above Receiver to be Feasible

As stated above, in this section we consider the case where the path difference between the two transmitters is an integer number of symbol durations. For example, one transmitter may be on a satellite, while the other is on a terrestrial base station. Thus, the optimal sampling point for the signal from both transmitted paths can be the same in one embodiment.

1. Channel Estimation

The receivers assume that the channel gains are known perfectly by the receiver in this embodiment. In any real system, however, channel gains are not known a priori and are estimated. There are many different existing schemes for channel estimation, either data aided (via preambles/pilots) or blind channel estimation and it is assumed that the channels are estimated prior to data demodulation.

2. Timing Synchronization

In order for the MMSE receivers described above to work efficiently in one embodiment, the receiver determines the path difference δ between the two transmitters. In satellite systems, the path difference might be hundreds of symbols long. In a frame (or packet) based system, the path difference may be several frames (or packets) long, for example. Preambles are typically used to attain synchronization in communication systems. However, the long path delay might require different preambles in different frames (rolling preambles) to determine the total path delay. This might also be achieved by using the same preamble on all frames but by having a frame sequence number in the header of each frame.

3. ISI Free Matched Filtering

Eqn. 12 assumes the presence of ISI free pulse shaping and correct symbol timing.

This can be accomplished by using a SQRT Nyquist Shaped pulse at both the transmitter as well as at the receiver.

4. Buffering of Data

In order to stack up the received data as shown in Eqn. 3.a, the received symbols are buffered and stored. Since δ could be hundreds of symbols in duration the amount of buffer can be relatively large.

5. Generalization to Multiple Transmitters

If there are more than two transmitters, the above equations can be readily generalized to accommodate a system using the same content on more than two transmitters.

C. MMSE Receivers—Same Content on Multiple Tx—Path Difference is not Integer Multiple of Symbol Time In this section, we illustrate the requirements of the receiver architecture when the path difference, δ, is NOT an integer number of symbol durations. In general, this is probably the more likely of the two scenarios. Once again, without loss of any generality, we assume that the first transmitter has the shorter path and that the receiver matched filter is synchronized to this transmitter (via say a timing recovery loop).

It is also assumed that the receiver matched filter is a filter satisfying the Nyquist criterion (e.g. SQRT Raised Cosine filters) and thus when the matched filter output is sampled at the optimal sampling points, there is little or no intersymbol interference (ISI). Conversely, it should be pointed out that when the sampling is NOT at the optimal sampling points, there is indeed intersymbol interference.

Since the optimal sampling point for the first transmitter is not the optimal sampling point for the second transmitter, the signal from the first transmitter does not have ISI whereas the signal from the second transmitter does have ISI. The received vector may be written as:

$$r[n] = H_1 x[n] + H_2 \sum_{l=-K}^{l=K} a[l] x[n - \delta - l] + n[n] \quad (5.a)$$

$$= H_1 x[n] + H_2 a^T x_K[n - \delta] + n[n] \quad (5.b)$$

where a is the vector of symbol spaced filter taps for the second transmitter. The filter length is assumed to be 2K+1 symbols long. Note that if the delay is an integer number of symbol durations, then a[l]=0 for all l≠0 (requirement of Nyquist filters) and the equation reduces to Eqn. 12. For notational purposes we use the following short-hand:

$$x_K[n] = \begin{bmatrix} x[n-K] \\ x[n-K+1] \\ \vdots \\ \vdots \\ x[n] \\ \vdots \\ \vdots \\ x[n+K-1] \\ x[n+K] \end{bmatrix} \quad (6)$$

Similar to Eqn. 2.a, one can now express the MMSE estimate of the transmitted signal x[n] as $$\hat{x}_{[n]} = R_{xy}(R_{yy})^{-1} r[n] \quad (7.a)$$

$$= H_1^H (H_1 H_1^H + H_2 a^T a^* H_2^H + \sigma_n^2 I)^{-1} r[n] \quad (7.b)$$

where ( )* indicates conjugation.

Similar to Eqn. 3.a, even in this case, one can improve the performance by expanding the window of observation vectors that is being used to estimate x[n]

1. Dual Matched Filtering

In the above section, we have assumed that the receiver matched filtering is synchronized to one transmitter. In this section, we employ a matched filter that is downsampled at the optimal sampling points for BOTH transmitters.

Thus, for each symbol duration, we get two vectors, one matched to the first transmitter and the other matched to the second transmitter. These two vectors may be written as:

$$r_1[n] = H_1 x[n] + H_2 \sum_{l=-K}^{l=K} a_2[l] x[n - \delta - l] + n[n] \quad (8.a)$$

$$= H_1 x[n] + H_2 a_2^T x_K[n - \delta] + n[n] \quad (8.b)$$

$$r_2[n] = H_1 \sum_{l=-K}^{l=K} a_1[l] x[n-l] + H_2 x[n - \delta] + n[n] \quad (8.c)$$

$$= H_1 a_1^T x_K[n] + H_2 x[n - \delta] + n[n] \quad (8.d)$$

Stacking these two vectors we can write:

$$r[n] = \begin{bmatrix} r_1[n] \\ r_2[n] \end{bmatrix} \quad (9.a)$$

$$= P x_K[n] + Q x_K[n - \delta] + n \quad (9.b)$$

Similar to the receivers above, now the MMSE solution may be obtained using Eqn. 2.a. Moreover, like before, the observation window may be expanded as well. Interestingly enough, since now x[n] contributes to received symbols around r[n], such as r[n−2], r[n−1], r[n+1] etc, the observation window does not have to buffer up large chunks of data to get some gains.

D. Simpler Rake Receivers

The above sections illustrate MMSE receivers. These embodiments of the receivers use the receiver to carry out matrix inversions. One can come up with another set of receivers that are simpler and do not require matrix inversions. A way of thinking about these receivers is that these receivers treat the interference as Gaussian noise. In contrast, the MMSE receivers try to take advantage of the correlation between the interference and the signal of interest.

Thus considering x[n−δ] to be the signal of interest, the received signal vector may be written as:

$$r_{rake}[n] = H_2 x[n-\delta] + n[n] \quad (10)$$

Combing $r_{rake}[n]$ and $r_{rake}[n-\delta]$, to form:

$$y_{rake}[n] = \begin{bmatrix} r_{rake}[n] \\ r_{rake}[n-\delta] \end{bmatrix} \quad (11.a)$$

$$= \begin{bmatrix} H_2 \\ H_1 \end{bmatrix} x[n-\delta] + \begin{bmatrix} n_1 \\ n_2 \end{bmatrix} \quad (11.b)$$

$$= H x[n-\delta] + n \quad (11.c)$$

We can now form the rake receiver as essentially a maximal ratio receiver. Thus, the demodulated symbol is given as:

$$\widehat{x_{[n-\delta]}} = \frac{1}{\|H\|_F} H^H y_{rake}[n] \quad (12)$$

E. Other Simplifications

The inverses of various matrices shown above may be evaluated using well-known matrix inverse simplification routes, e.g., the Matrix Inversion Lemma may be used. QR decomposition, Singular Value Decomposition, Cholesky Factorization are some well known schemes. If the matrix to be inverted is ill-conditioned, then various regularization techniques (such as Tychonov regularization) may be used as well. These are very well known in the field of linear algebra and are not outlined in detail here. The fact that some of the matrix elements are known to be zero as well as the fact that some of the matrices have a Toeplitz structure may also be utilized to make the calculations simpler.

F. Different Content being Transmitted by Transmitters

In this section, we consider the case where the transmitters have their own independent data stream to transmit rather than repeating what the data from each other. Now the received vector may be written as:

$$r[n]=Hx[n]+n[n] \qquad (13)$$

Here, the transmitted signal x[n] is a vector of symbols transmitted from the different transmitters. Since all the data symbols are independent, the fact that there is a different path delay between the transmitters and the receivers can be accommodated in this notation.

The MMSE receiver that jointly estimates the transmitted vector is now given by $$\hat{x} = H^H(HH^H + \sigma_n^2 I)^{-1} r[n] \qquad (14)$$

Layered processing can improve performance in some embodiments. In this scheme, first the data from one transmitter is decoded, and then it is subtracted from the received data stream. Then the data from the second transmitter is decoded. This is known as layered successive interference cancellation (SIC). In fact, ordered SIC may perform even better in some embodiments. In this method, the transmitter with the best SNR is decoded first.

A number of variations and modifications of the disclosed embodiments can also be used. For example, the above embodiments do not discuss each satellite having multiple radios for a given link. One embodiment could do that and still form a MIMO link using radios from any permutation one satellite, two or more satellites and/or two or more regional repeaters. For example, there could be a two satellite embodiment where each has two radios for a given link. The two radios from each could be combined into a single MIMO link with four radios. Any other permutation could be done also. Reconfiguration to achieve this embodiment could be done after deployment of the satellite. Some embodiments could allow dynamically rearranging the radios.

The above embodiments discuss creating a MIMO link using both satellites and/or regional repeaters. This link in some embodiments can be with two or more regional repeaters and/or two or more satellites. For example, the MIMO link could get at least some of the same data from two regional repeaters while enjoying at least some diversity gain.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing that contain or carry instruction(s) and/or data.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the principles of the disclosure have been described above in connection with specific apparatuses and methods, it is to be clearly understood that this description is made only by way of example and not as limitation on the scope of the disclosure.

What is claimed is:

1. A satellite communication system for bi-directional communication, the satellite communication system comprising:
   a plurality of subscriber terminals, wherein:
      each of the plurality of subscriber terminals uses a plurality of antenna,
      the plurality of subscriber terminals utilize at least some spatial multiplexing, and
      each of the plurality of subscriber terminals is configured to process a higher information rate signal constructed from at least a first lower information rate signal and a second lower information rate signal;
   a first node to relay the first lower information rate signal between a ground station and the plurality of subscriber terminals; and
   a second node to relay the second lower information rate signal to the plurality of subscriber terminals, wherein:
      the first node comprises a satellite,
      the second node comprises a satellite,
      the first and second nodes are separated by 50 miles or more,
      the first and second lower information rate signals have at least partially overlapping information,
      the first lower information rate signal uses a first frequency range for relaying information to the plurality of subscriber terminals,
      the second lower information rate signal uses a second frequency range for relaying information to the plurality of subscriber terminals, and
      use of the first and second frequency ranges at least partially overlap in frequency coincident in time.

2. The satellite communication system for bi-directional communication as recited in claim 1, wherein:
   the first lower information rate signal relays first information for the plurality of subscriber terminals,
   the second lower information rate signal relays second information for the plurality of subscriber terminals, and
   the second information comprises the first information and additional information.

3. The satellite communication system for bi-directional communication as recited in claim 1, wherein the satellites move over time while operational.

4. The satellite communication system for bi-directional communication as recited in claim 1, wherein at least some of the plurality of subscriber terminals are mobile subscriber terminals.

5. The satellite communication system for bi-directional communication as recited in claim 1, wherein the plurality of subscriber terminals utilize spatial diversity.

6. The satellite communication system for bi-directional communication as recited in claim 1, wherein:
   the first lower information rate signal uses a first coding and modulation,
   the second lower information rate signal uses a second coding and modulation, and
   the first coding and modulation is different from the second coding and modulation.

7. The satellite communication system for bi-directional communication as recited in claim 1, wherein the first node includes a plurality of transmit antennas that use directional beam forming.

8. The satellite communication system for bi-directional communication as recited in claim 1, wherein the first node uses polarization diversity when communicating with the plurality of subscriber terminals.

9. A satellite communication system for bi-directional communication, the satellite communication system comprising:
   a plurality of subscriber terminals, wherein:
      each of the plurality of subscriber terminals uses a plurality of antenna,
      the plurality of subscriber terminals utilize at least some spatial multiplexing, and
      each of the plurality of subscriber terminals is configured to process a higher information rate signal constructed from at least a first lower information rate signal and a second lower information rate signal;
   a first node to relay the first lower information rate signal between a ground station and the plurality of subscriber terminals; and
   a second node to relay the second lower information rate signal to the plurality of subscriber terminals, wherein:
      at least one of the first and second nodes comprises a satellite,
      the first and second nodes are separated by 50 miles or more,
      the first lower information rate signal uses a first frequency range for relaying information to the plurality of subscriber terminals,
      the second lower information rate signal uses a second frequency range for relaying information to the plurality of subscriber terminals,
      use of the first and second frequency ranges at least partially overlap in frequency coincident in time,
      the first node comprises the satellite,
      the second node comprises a second satellite, and
      the satellite and the second satellite are in different orbital slots.

10. A satellite communication system for bi-directional communication, the satellite communication system comprising:
   a plurality of subscriber terminals, wherein:
      each of the plurality of subscriber terminals uses a plurality of antenna,
      the plurality of subscriber terminals utilize at least some spatial multiplexing, and
      each of the plurality of subscriber terminals is configured to process a higher information rate signal constructed from at least a first lower information rate signal and a second lower information rate signal;
   a first node to relay the first lower information rate signal between a ground station and the plurality of subscriber terminals; and
   a second node to relay the second lower information rate signal to the plurality of subscriber terminals, wherein:
      at least one of the first and second nodes comprises a satellite,
      the first and second nodes are separated by 50 miles or more,
      the first lower information rate signal uses a first frequency range for relaying information to the plurality of subscriber terminals, the second lower information rate signal uses a second frequency range for relaying information to the plurality of subscriber terminals,
use of the first and second frequency ranges at least partially overlap in frequency coincident in time,
the first node comprises the satellite,
the second node comprises a second satellite, and
the satellite and the second satellite are separated by at least 2 degrees.

11. A satellite communication system for bi-directional communication, the satellite communication system comprising:
a plurality of subscriber terminals, wherein:
each of the plurality of subscriber terminals uses a plurality of antenna,
the plurality of subscriber terminals utilize at least some spatial multiplexing, and
each of the plurality of subscriber terminals is configured to process a higher information rate signal constructed from at least a first lower information rate signal and a second lower information rate signal;
a first node to relay the first lower information rate signal between a ground station and the plurality of subscriber terminals; and
a second node to relay the second lower information rate signal to the plurality of subscriber terminals, wherein:
the first node comprises a satellite,
the second node comprises a satellite,
the first and second nodes are separated by 50 miles or more,
the first lower information rate signal uses a first frequency range for relaying information to the plurality of subscriber terminals,
the second lower information rate signal uses a second frequency range for relaying information to the plurality of subscriber terminals,
use of the first and second frequency ranges at least partially overlap in frequency coincident in time,
the first node is nulled when processing a first time by one of the plurality of subscriber terminals, and
the second node is nulled when processing a second time by the one of the plurality of subscriber terminals.

12. A satellite communication system for wireless communication, comprising:
a plurality of subscriber terminals, wherein:
each of the plurality of subscriber terminals uses a plurality of antenna, and
each of the plurality of subscriber terminals is configured to process signals from the plurality of antenna using spatial relationships to differentiate streams;
a first node to relay a first stream between a ground station and the plurality of subscriber terminals; and
a second node to relay a second stream to the plurality of subscriber terminals, wherein:
the first node comprises a satellite,
the second node comprises a satellite,
the first and second nodes are separated by 100 miles or more,
the first stream uses a first frequency range for relaying first information to the plurality of subscriber terminals,
the second stream uses a second frequency range for relaying second information to the plurality of subscriber terminals,
the first information and the second information have at least partially overlapping information, and
use of the first and second frequency ranges at least partially overlap in frequency coincident in time.

13. The satellite communication system for wireless communication as recited in claim 12, wherein the plurality of subscriber terminals use spatial multiplexing to decode unique information on the streams.

14. A satellite communication system for wireless communication, comprising:
a plurality of subscriber terminals, wherein:
each of the plurality of subscriber terminals uses a plurality of antenna, and
each of the plurality of subscriber terminals is configured to process signals from the plurality of antenna using spatial relationships to differentiate streams;
a first node to relay a first stream between a ground station and the plurality of subscriber terminals; and
a second node to relay a second stream to the plurality of subscriber terminals, wherein:
at least one of the first and second nodes comprises a satellite,
the first and second nodes are separated by 100 miles or more,
the first stream uses a first frequency range for relaying information to the plurality of subscriber terminals,
the second stream uses a second frequency range for relaying information to the plurality of subscriber terminals,
use of the first and second frequency ranges at least partially overlap in frequency coincident in time,
the first node comprises the satellite,
the second node comprises a second satellite, and
the satellite and the second satellite are in different orbital slots.

15. A method for communicating with orbital satellite links, the method comprising steps of:
receiving with a first antenna at a subscriber terminal the first stream and the second stream, wherein:
the first stream is generated by a first node,
the second stream is generated by a second node, and
the first and second nodes are separated by at least 200 miles,
at least one of the first and second nodes comprises a satellite;
receiving with a second antenna at a subscriber terminal the first stream and the second stream, wherein:
the first and second stream encapsulate overlapping information,
the first stream uses a first frequency range for relaying information,
the second stream uses a second frequency range for relaying information, and
the first and second frequency ranges at least partially overlap and are used coincident in time;
processing signals from the first and second antennas to determine the first and second streams, wherein the processing step comprises a sub-step of analyzing a relationship between the first node, the second node and the first and second antenna to spatially differentiate the first stream from the second stream,
wherein the processing step comprises a sub-step of performing minimum mean-squared error (MMSE) estimation to choose one of the first stream or the second stream.

16. The method for communicating with orbital satellite links as recited in claim 15, wherein:
the first stream comprises first information,
the second stream comprises second information, and the second information comprises the first information and additional information.

17. The method for communicating with orbital satellite links as recited in claim 15, wherein:
the first lower information rate signal uses a first coding and modulation,
the second lower information rate signal uses a second coding and modulation, and
the first coding and modulation is different from the second coding and modulation.

18. The method for communicating with orbital satellite links as recited in claim 15, wherein the first node is a satellite and the second node is a terrestrial base station.

19. A method for communicating with orbital satellite links, the method comprising steps of:
receiving with a first antenna at a subscriber terminal a first stream and a second stream, wherein:
the first stream is generated by a first node,
the second stream is generated by a second node, and
the first and second nodes are separated by at least 200 miles,
at least one of the first and second nodes comprises a satellite;
receiving with a second antenna at a subscriber terminal the first stream and the second stream, wherein:
the first stream uses a first frequency range for relaying information,
the second stream uses a second frequency range for relaying information, and
the first and second frequency ranges at least partially overlap and are used coincident in time;
processing signals from the first and second antennas to determine the first and second streams, wherein the processing step comprises a sub-step of analyzing a relationship between the first node, the second node and the first and second antenna to spatially differentiate the first stream from the second stream;
wherein the processing step comprises a sub-step of performing minimum mean-squared error (MMSE) estimation to choose one of the first or second stream.

20. A method for communicating with orbital satellite links, the method comprising steps of:
receiving with a first antenna at a subscriber terminal a first stream and a second stream, wherein:
the first stream is generated by a first node,
the second stream is generated by a second node,
the second stream operates at a higher symbol rate than the first stream,
the first node comprises a terrestrial base station, and
the second node comprises a satellite;
receiving with a second antenna at the subscriber terminal the first stream and the second stream; and
processing signals from the first and second antennas using determined spatial relationships to differentiate the first stream from the second stream, wherein processing the signals comprises a sub-step of performing minimum mean-squared error (MMSE) estimation to choose one of the first stream or the second stream and nulling the first node when processing signaling from the second node.

21. The method for communicating with orbital satellite links as recited in claim 20, wherein the first and second streams utilize spatial multiplexing.

22. The method for communicating with orbital satellite links as recited in claim 20, wherein:
the first stream uses a first frequency range for relaying information,
the second stream uses a second frequency range for relaying information, and
the first and second frequency ranges at least partially overlap.

23. The method for communicating with orbital satellite links as recited in claim 20, wherein the first stream includes additional information that is localized for various geographic regions associated with a subscriber terminal comprising the first and second antenna.

24. The method for communicating with orbital satellite links as recited in claim 20, further comprising steps of:
determining a location is known for a subscriber terminal comprising the first and second antennas; and
customizing the first stream according to the location.

* * * * *